(12) United States Patent
Zhou et al.

(10) Patent No.: US 12,395,908 B2
(45) Date of Patent: Aug. 19, 2025

(54) L1/L2 MOBILITY AND CELL GROUP ACTIVATION/DEACTIVATION

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 17/815,471

(22) Filed: Jul. 27, 2022

(65) Prior Publication Data

US 2024/0040454 A1 Feb. 1, 2024

(51) Int. Cl.
*H04W 4/00* (2018.01)
*H04W 36/00* (2009.01)
*H04W 36/08* (2009.01)

(52) U.S. Cl.
CPC ....... *H04W 36/08* (2013.01); *H04W 36/0061* (2013.01)

(58) Field of Classification Search
CPC .......................... H04W 36/08; H04W 36/0061
See application file for complete search history.

(56) References Cited

U.S. PATENT DOCUMENTS

| | | | | |
|---|---|---|---|---|
| 11,330,653 B2 * | 5/2022 | Paladugu | ............... | H04W 72/04 |
| 2015/0365831 A1 * | 12/2015 | Ko | ................. | H04L 5/0053 370/329 |
| 2019/0387561 A1 * | 12/2019 | Paladugu | ................ | H04W 8/24 |
| 2020/0008245 A1 * | 1/2020 | Yan | ................... | H04W 36/0072 |
| 2022/0014983 A1 * | 1/2022 | Zhou | ..................... | H04W 76/15 |
| 2022/0150772 A1 * | 5/2022 | Wu | ........................ | H04W 40/36 |
| 2022/0182894 A1 | 6/2022 | Damnjanovic et al. | | |
| 2023/0007499 A1 * | 1/2023 | Da Silva | ............... | H04W 24/02 |
| 2023/0354109 A1 * | 11/2023 | Damnjanovic | ... | H04W 36/0055 |
| 2023/0397056 A1 * | 12/2023 | Zhou | ................ | H04W 36/0069 |
| 2024/0040454 A1 * | 2/2024 | Zhou | ................ | H04W 36/0061 |
| 2024/0049151 A1 * | 2/2024 | Oh | ........................ | H04L 1/1854 |

FOREIGN PATENT DOCUMENTS

WO 2022006382 A1 1/2022

OTHER PUBLICATIONS

International Search Report and Written Opinion—PCT/US2023/028035—ISA/EPO—Oct. 26, 2023.
Qualcomm Incorporated: "L1/L2 Mobility-General Concepts and Configuration", 3GPP TSG-RAN WG2 Meeting #119-e, R2-2207340, 3rd Generation Partnership Project, Mobile Competence Centre, 650, Route Des Lucioles, F-06921 Sophia-Antipolis Cedex, France, vol. RAN WG2, No. Electronic, Aug. 15, 2022-Aug. 26, 2022, Aug. 8, 2022, 6 Pages, XP052260662, p. 4, Figure 4, Section 2, Paragraph [02.5], Paragraph [02.6], pp. 1-5, Sections 2.1, 2.4, Paragraph 2.1, See sections 1 and 2.1-2.4.

* cited by examiner

*Primary Examiner* — Abdelnabi O Musa
(74) *Attorney, Agent, or Firm* — Procopio, Cory, Hargreaves & Savitch LLP

(57) ABSTRACT

A method of wireless communication at a UE is disclosed herein. The method includes receiving a L1 or L2 mobility cell configuration for a set of multiple cell groups. Each cell group comprises multiple cells. Cell groups within the set of multiple cell groups are able to be activated or deactivated for L1 or L2 mobility. The method further includes receiving L1 or L2 signaling indicating a PCG from one or more activated cell groups, the PCG including a cell that serves as a SpCell.

29 Claims, 21 Drawing Sheets

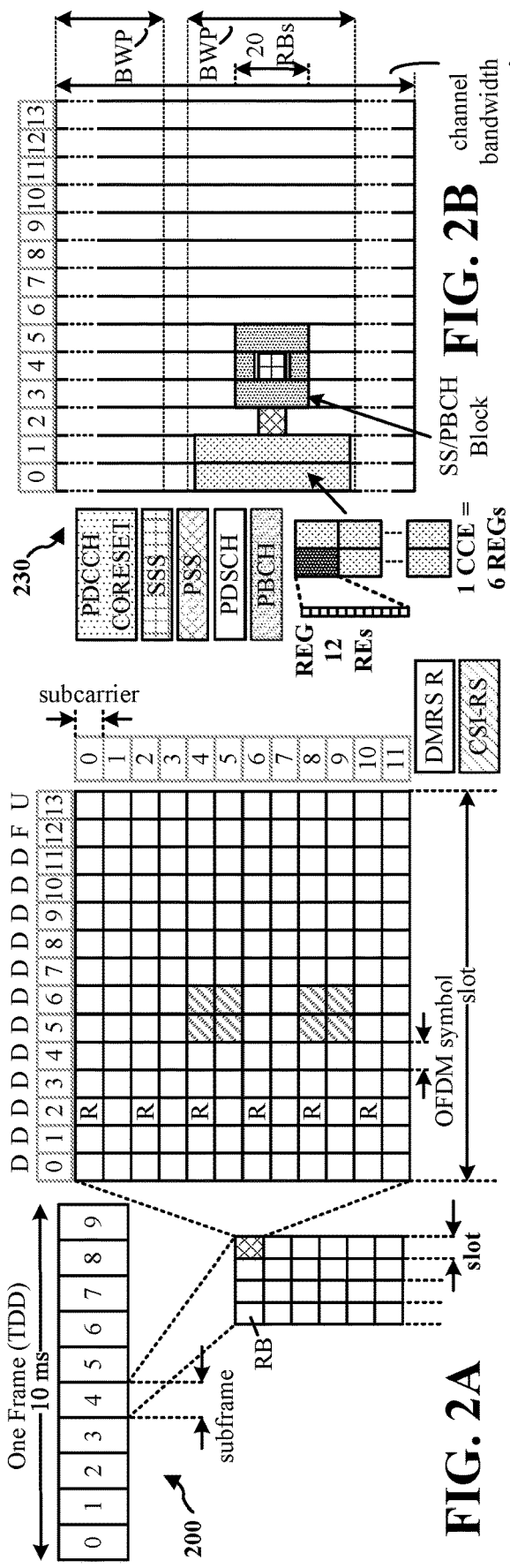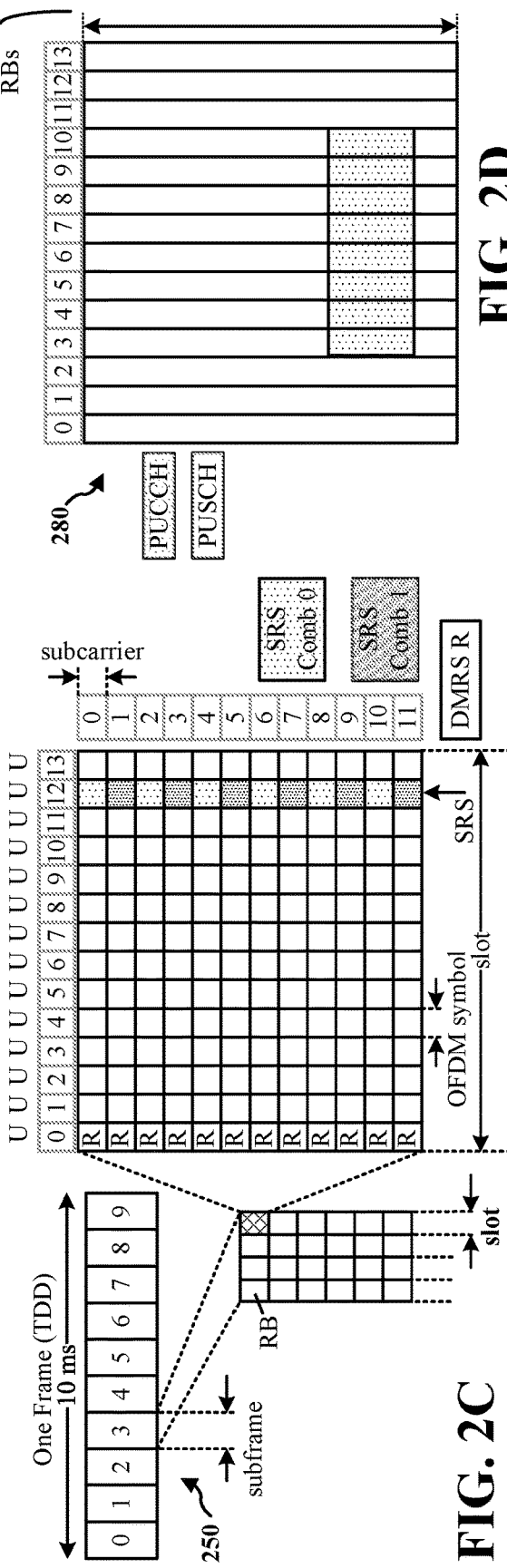

L1/L2 MOBILITY AND CELL GROUP ACTIVATION/DEACTIVATION

TECHNICAL FIELD

The present disclosure relates generally to communication systems, and more particularly, to mobility and cell group activation/deactivation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus is configured to receive a layer 1 (L1) or layer 2 (L2) mobility cell configuration for a set of multiple cell groups for L1 or L2 inter-cell mobility, each cell group comprising multiple cells, wherein cell groups within the set of multiple cell groups are able to be activated or deactivated for L1 or L2 mobility; and receive L1 or L2 signaling indicating a primary cell group (PCG) from one or more activated cell groups, the PCG including a cell that serves as a special cell (SpCell).

In an aspect of the disclosure, a method, a computer-readable medium, and an apparatus for wireless communication at a network node are provided. The apparatus is configured to transmit a layer 1 (L1) or layer 2 (L2) mobility cell configuration for a set of multiple cell groups for L1 or L2 inter-cell mobility, each cell group comprising multiple cells, wherein cell groups within the set of multiple cell groups are able to be activated or deactivated for L1 or L2 mobility; and transmit L1 or L2 signaling indicating a primary cell group (PCG) from one or more activated cell groups, the PCG including a cell that serves as a special cell (SpCell).

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
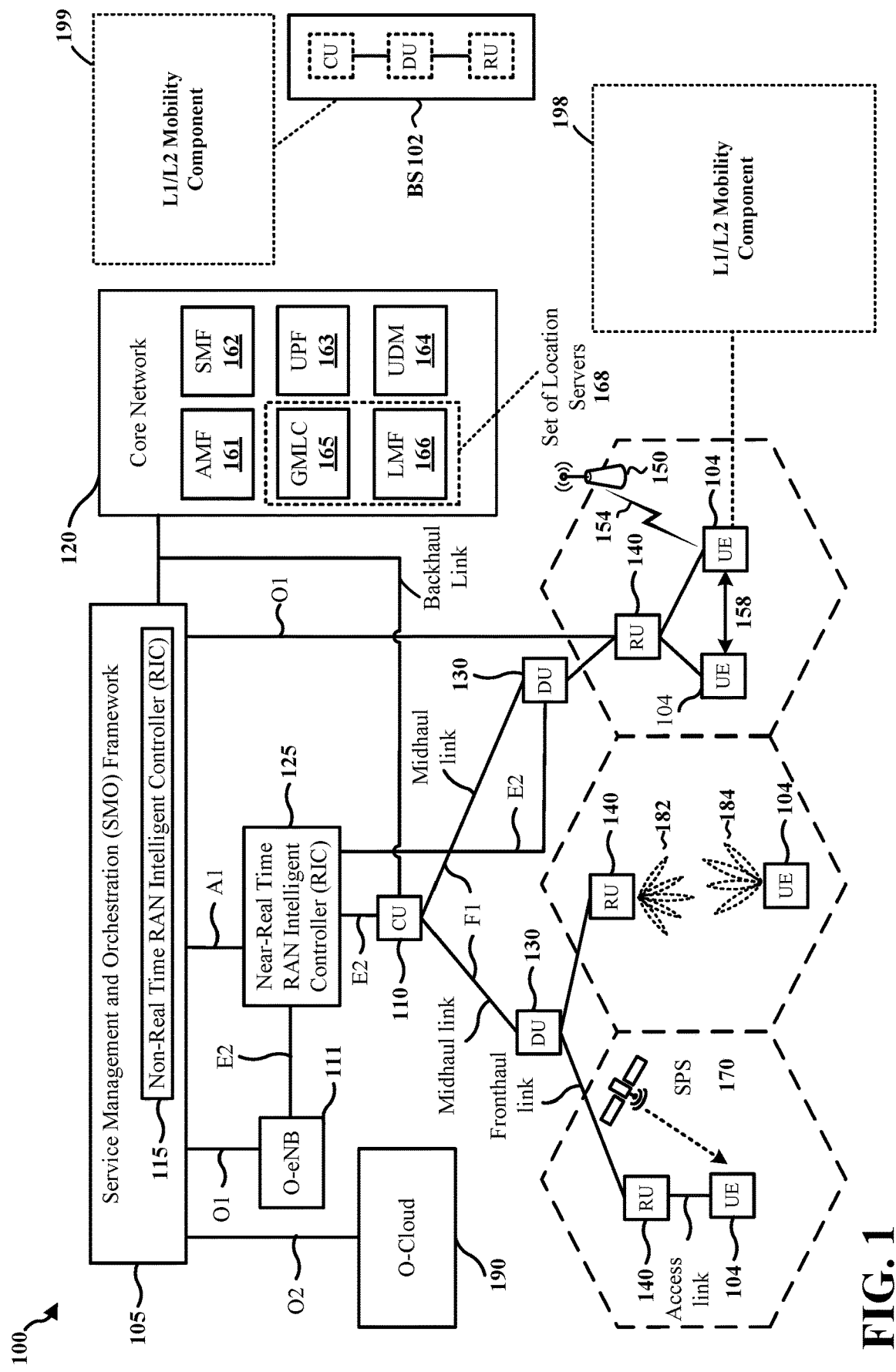
FIG. 1 is a diagram illustrating an example of a wireless communications system and an access network.

A network node (e.g., a base station) may change a special cell (SpCell) for a UE using a layer 3 (L3) handover (e.g., using radio resource control (RRC) signaling). However, L3 handovers may be time consuming and/or inefficient. Aspects presented herein provide a mechanism to more rapidly change a PCG and/or a SpCell without a degradation in service quality. A network node that utilizes the improved L1/L2 signaling scheme is able to change an SpCell for a UE in a more rapid manner in comparison to L3 (RRC) based approaches. In an example, a UE receives a L1 or L2 mobility cell configuration for a set of multiple cell groups, each cell group comprising multiple cells, where cell groups within the set of multiple cell groups are able to be activated or deactivated for L1 or L2 mobility. The UE receives L1 or L2 signaling indicating a primary cell group (PCG) from one or more activated cell groups, the PCG including a cell that serves as a special cell (SpCell). Via the aforementioned L1 or L2 signaling, an SpCell (or a PCG) is able to be changed in a manner that avoids RRC-based signaling. As a result, the SpCell may be changed in a more rapid manner in comparison to RRC-based signaling. The improved L1/L2 signaling scheme may also be utilized to perform cell group activation/deactivation for a set of multiple cell groups. Changes in the PCG and cell group activation/deactivation may be performed simultaneously in the same message or separately in different messages.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (which may be referred to as a gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an L1/L2 mobility component 198 that is configured to receive a L1 or L2 mobility cell configuration for a set of multiple cell groups for L1 or L2 inter-cell mobility, each cell group comprising multiple cells, wherein cell groups within the set of multiple cell groups are able to be activated or deactivated for L1 or L2 mobility and receive L1 or L2 signaling indicating a PCG from one or more activated cell groups, the PCG including a cell that serves as a SpCell. In certain aspects, the base station 102 may include a L1/L2 mobility component that is configured to transmit a L1 or L2 mobility cell configuration for a set of multiple cell groups for L1 or L2 inter-cell mobility, each cell group comprising multiple cells, wherein cell groups within the set of multiple cell groups are able to be activated or deactivated for L1 or L2 mobility and to transmit L1 or L2 signaling indicating a PCG from one or more activated cell groups, the PCG including a cell that serves as a SpCell. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |

TABLE 1-continued

Numerology, SCS, and CP

| μ | SCS $\Delta f = 2^\mu \cdot 15$ [kHz] | Cyclic prefix |
|---|---|---|
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
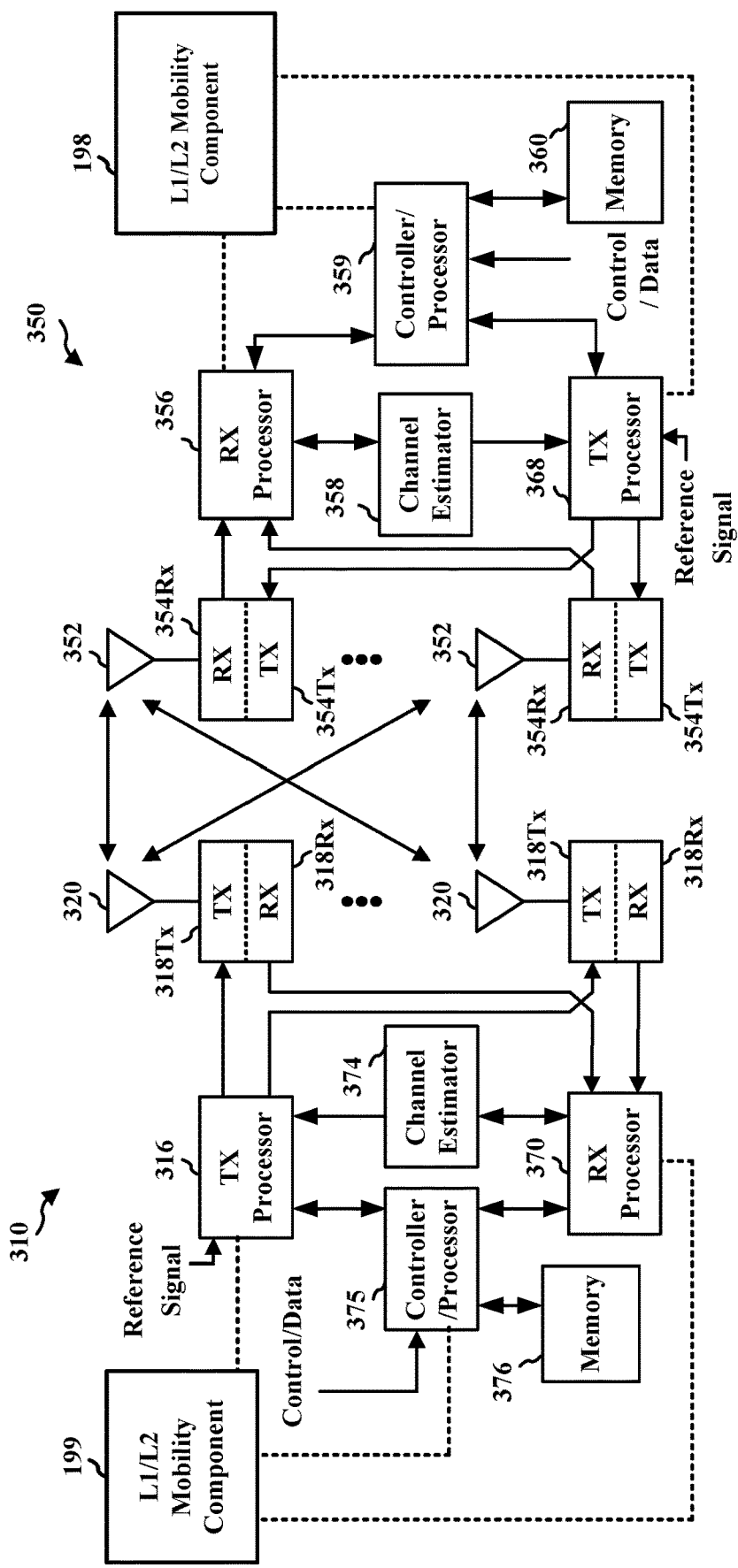
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

Figure 4:
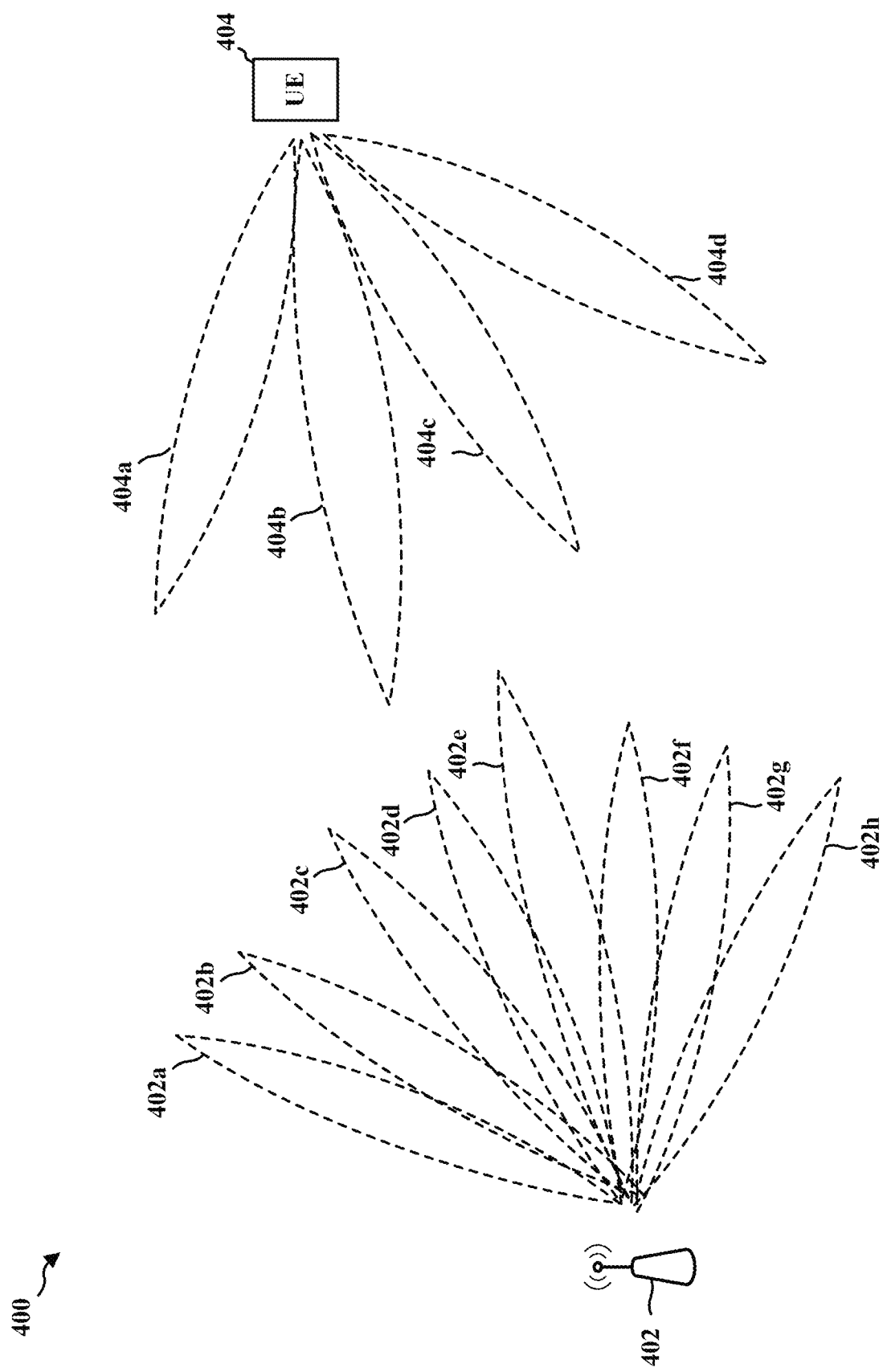
FIG. 4 is a diagram illustrating example communications between a base station and a UE for beamforming, in accordance with various aspects of the present disclosure.

As described in connection with example 400 in FIG. 4, the base station 402 and UE 404 may communicate over active data/control beams both for DL communication and UL communication. The base station and/or UE may switch to a new beam direction using beam failure recovery procedures. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, the UE 404 may determine to switch beams, e.g., between beams 402a-402h. The beam at the UE 404 may be used for reception of downlink communication and/or transmission of uplink communication. In some examples, the base station 402 may send a transmission that triggers a beam switch by the UE 404. For example, the base station 402 may indicate a transmission configuration indication (TCI) state change, and in response, the UE 404 may switch to a new beam for the new TCI state of the base station 402. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication. In some aspects, a single MAC-CE command may be sent by the base station to trigger the changing of the TCI state on multiple CCs.

A TCI state may include quasi co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The base station may indicate a TCI state to the UE as a transmission configuration that indicates QCL relationships between one signal (e.g., a reference signal) and the signal to be transmitted/received. For example, a TCI state may indicate a QCL relationship between DL RS s in one RS set and PDSCH/PDCCH DM-RS ports. TCI states can provide information about different beam selections for the UE to use for transmitting/receiving various signals. An example RS may be an SSB, a tracking reference signal (TRS) and associated CSI-RS for tracking, a CSI-RS for beam management, a CSI-RS for CQI management, a DM-RS associated with non-UE-dedicated reception on PDSCH and a subset (which may be a full set) of control resource sets (CORESETs), or the like. A TCI state may be defined to represent at least one source RS to provide a reference (e.g., UE assumption) for determining quasi-co-location (QCL) or spatial filters. For example, a TCI state may define a QCL assumption between a source RS and a target RS.

Figure 5:
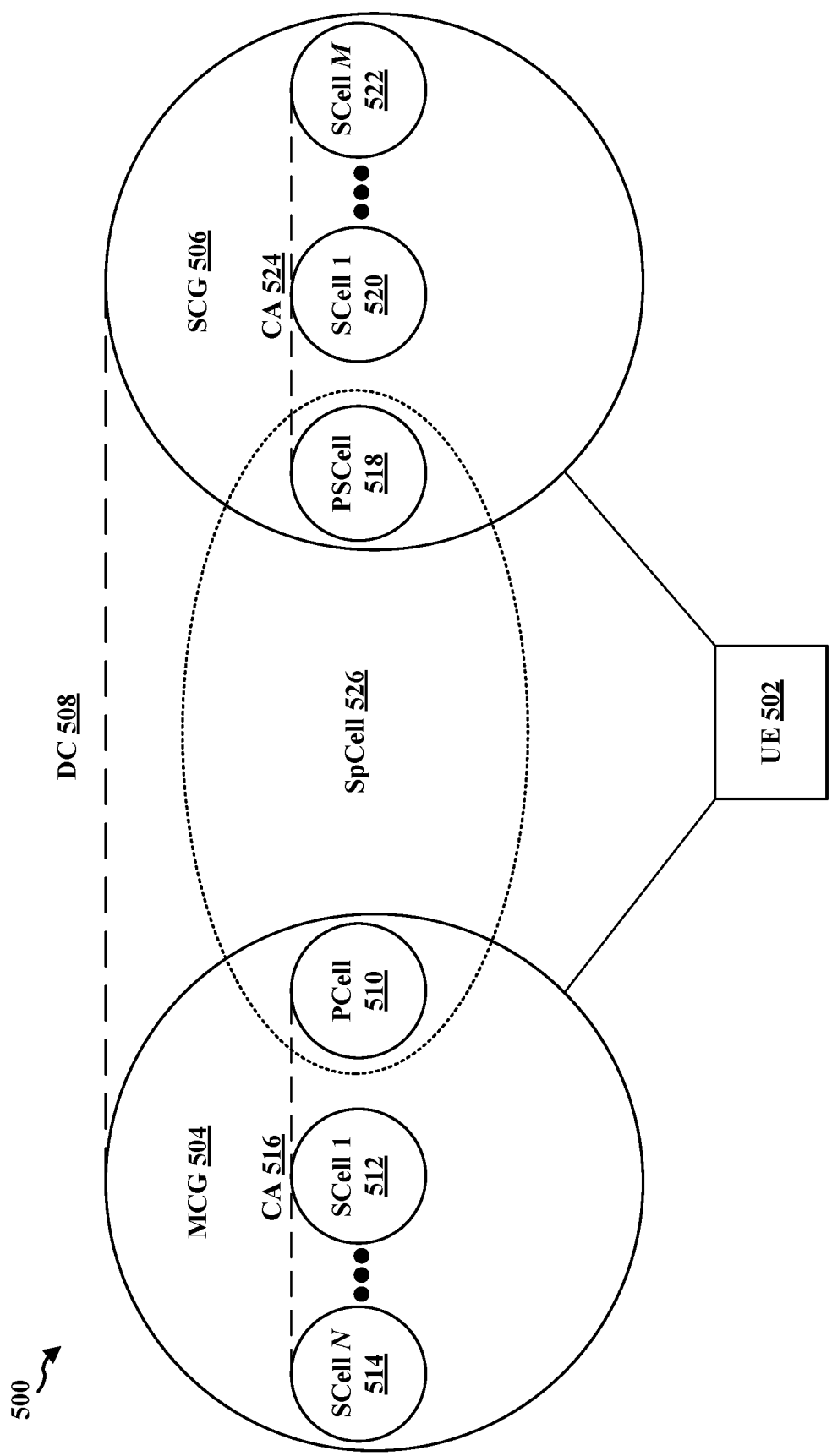
FIG. 5 is a diagram illustrating example cell designations.

FIG. 5 is a diagram 500 that illustrates an example of dual connectivity and carrier aggregation (CA). A UE 502 may be connected to a master cell group (MCG) 504 and a secondary cell group (SCG) 506. Such an arrangement may be referred to as dual connectivity (DC) 508. The MCG 504 may be a group of serving cells associated with a master node that has a control plane connection to a core network (e.g., the core network 120). The master node may be a base station such as an gNB, an eNB, etc. (i.e., a network entity). The SCG 506 may be a group of serving cells associated with a secondary node that does not have a control plane connection to the core network. The secondary node may be a base station, such as a gNB, an eNB, etc. (i.e., a network entity). The MCG 504 may become the SCG 506 and the SCG 506 may become the MCG 504 based upon various factors, such as a location of the UE 502, network conditions, etc.

The MCG 504 includes a PCell 510. The MCG 504 may also include one or more SCells (e.g., a first SCell 512 and an Nth SCell 514, where N is a positive integer greater than one). The PCell 510, the first SCell 512, and/or the Nth SCell 514 may be in a CA 516 configuration. In some aspects, a primary cell may become a secondary cell or that a secondary cell may become a primary cell based upon various factors, such as a location of the UE 502, network conditions, etc.

The SCG 506 includes a primary secondary cell (PSCell) 518. The PSCell 518 is a primary cell of the SCG 506. The SCG 506 may also include one or more SCells (e.g., a first SCell 520 and an Mth SCell 522, where M is a positive integer greater than one). The PSCell 518, the first SCell 520, and/or the Mth SCell 522 may be in a CA configuration 524. In some aspects, a primary secondary cell may become a secondary cell or that a secondary cell may become a primary secondary cell based upon various factors, such as a location of the UE 502, network conditions, etc.

The PCell 510 of the MCG 504 and the PSCell 518 of the SCG 506 may be referred to as a special cell (SpCell) 526. For Dual Connectivity operation the term SpCell refers to the PCell of the MCG or the PSCell of the SCG, e.g., depending on whether the MAC entity is associated to the MCG or the SCG, respectively. An SpCell supports PUCCH transmission and contention-based random access, and is always activated. The SpCell 526 is responsible for data and control functionality. In cases in which there is no DC (e.g., when only the MCG 504 is configured and when the SCG 506 is not configured), the PCell 510 may be referred to as the SpCell 526. A cell group that includes the SpCell 526 may be referred to as a PCG. It is to be understood that an SpCell may change based upon various factors, such as a location of the UE 502, network conditions, etc. In an example, a network entity may configure the first SCell 512 as a primary cell and Mth SCell 522 as a primary secondary cell to configure a new SpCell.

At least one of the TX processor 368, the RX processor 356, and the controller/processor 359 may be configured to perform aspects in connection with the report component 198 of FIG. 1.

At least one of the TX processor 316, the RX processor 370, and the controller/processor 375 may be configured to perform aspects in connection with the L1/L2 mobility component 199 of FIG. 1.

In a wireless communication system, the network may aim to ensure that a UE maintains connectivity with a network entity (e.g., a base station) as the UE moves within a network. L1/L2 based inter-cell mobility may help to reduce mobility latency. For instance, configuration and maintenance of multiple candidate cells may allow for rapid application of configurations for candidate cells. Furthermore, dynamic switching mechanisms among candidate serving cells (including an SpCell and SCell) based on L1/L2 signaling may further reduce latency.

L1/L2 based inter-cell mobility may be applicable to standalone operation scenarios, CA scenarios, and DC (e.g. NR-DC) scenarios. In the standalone operation scenarios and CA scenarios, L1/L2 based inter-cell mobility may be applicable for intra-DU cases and/or intra CU inter-DU cases. L1/L2 based inter-cell mobility is applicable in both FR1 and FR2, as well as both in intra-frequency and inter-frequency. In L1/L2 based inter-cell mobility, source cells and target cells may be synchronized or non-synchronized.

As noted above, a network entity (e.g., a base station) may change the SpCell using a layer 3 (L3) handover (e.g., using RRC). However, L3 handovers can be time consuming. Aspects presented herein provide a mechanism to more rapidly change the SpCell without a degradation in service quality.

To address the aforementioned issues, an improved L1/L2 signaling scheme is disclosed herein. A network entity that utilizes the improved L1/L2 signaling scheme is able to activate or change a primary cell group and/or to activate or change an SpCell in a more rapid manner in comparison to L3 (RRC) based approaches. The improved L1/L2 signaling scheme may utilize MAC-CE message(s) or DCI message(s). The MAC-CE/DCI message(s) may both select/change an identity of an SpCell as well as activate/deactivate cell groups within a configured cell set.

Figure 6:
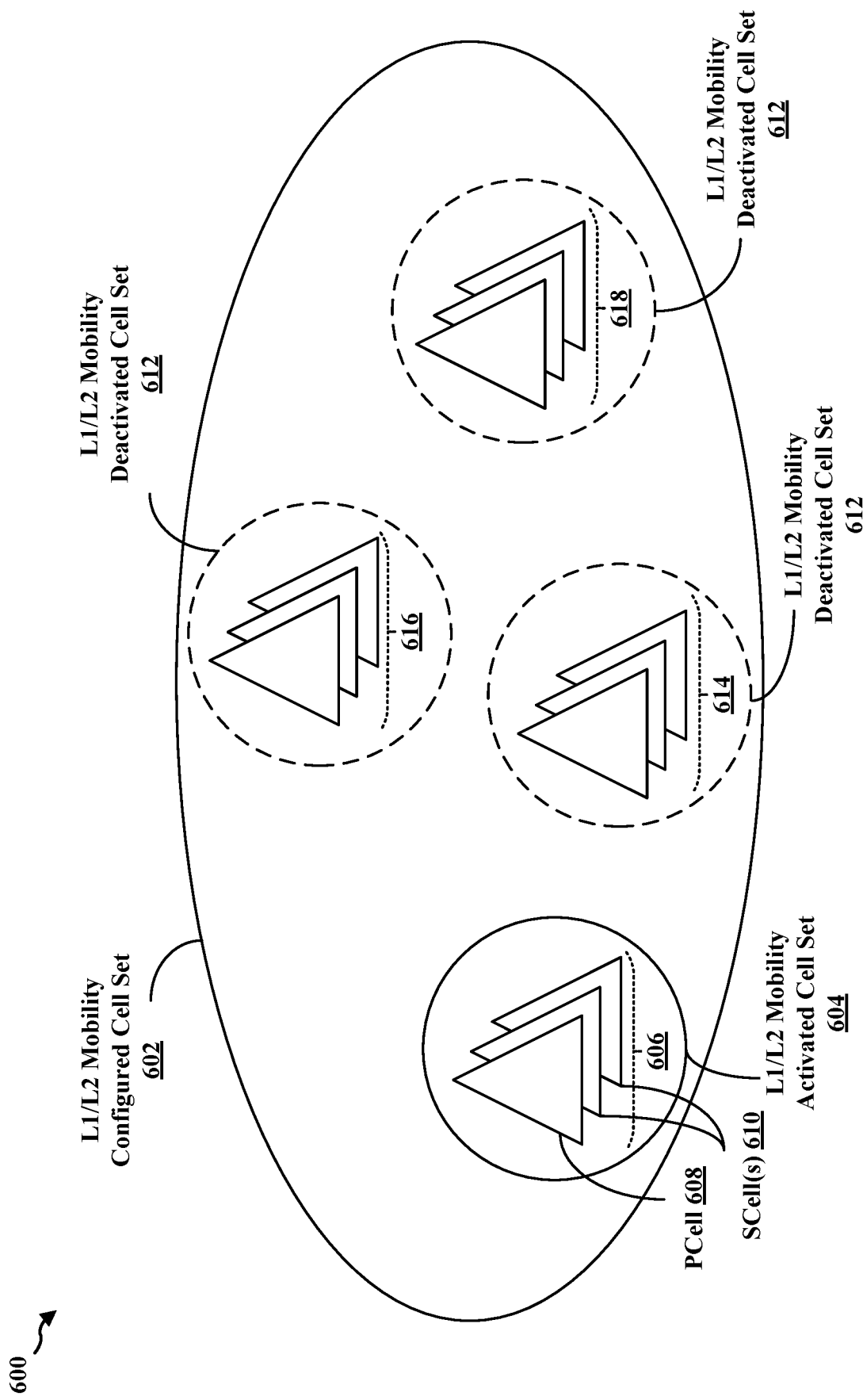
FIG. 6 is a diagram illustrating an example cell configuration.
Figure 15:
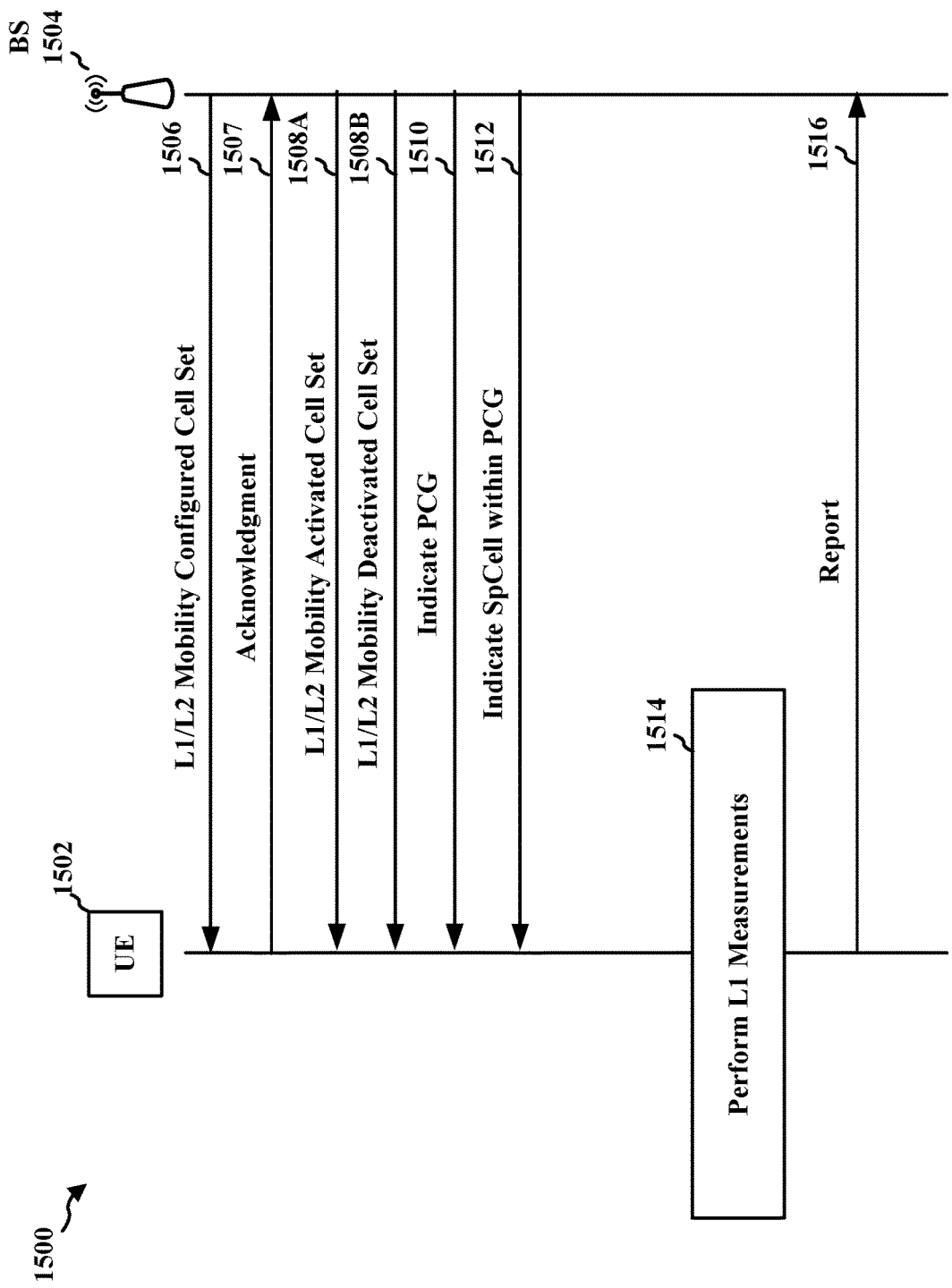
FIG. 15 is an example communication flow diagram.

A base station may configure a UE, e.g., in RRC signaling, with a set of cells for L1/L2 mobility. The set of cells may be referred to as an L1/L2 mobility configured set. A subset of the cells in the configured set may be activated and can be used for data and control transfer between the UE and the network. The subset of activated cells may be referred to as the L1/L2 mobility activated cell set. A subset of the L1/L2 mobility configured set may be deactivated and may be referred to as the L1/L2 mobility deactivated set. The L1/L2 deactivated set of cells can be activated for the UE by L1/L2 signaling from the network. Aspects presented herein provide for group level mobility management of the activated set, e.g., providing L1/L2 signaling that may be used to activate/deactivate cell groups within the L1/L2 mobility configured set of cells and/or to select beams within the activated cells. The group level mobility management may provide seamless mobility within the activated cell groups within the set. FIG. 6 is a diagram 600 that illustrates an example cell configuration and group level mobility management. In the diagram 600 (as well as in subsequent diagrams), a triangle represents a cell and groups of overlapping triangles represent cell groups (i.e., groups of cells). A network entity (e.g., the base station 102, 310, 402, or the network entity 2102) configures, via RRC, a L1/L2 mobility configured cell set 602 for a UE (e.g., UE 104, 350, 404). For instance, the network entity may configure each cell group within the L1/L2 mobility configured cell set 602 using a L1/L2MobilityCellGroupConfigList. L1/L2 signaling may indicate an activation status of each cell group within the L1/L2 mobility configured cell set 602. For example, the network entity may activate and/or deactivate cell groups from the set using L1/L2 signaling. The activation and/or deactivation may be based on signal quality measurements, loading, etc. When a UE connects to a new cell within a cell group, e.g., cell group 606, the UE may be connected to each cell in the cell group. For example, FIG. 15 illustrates an example communication flow 1500 between a BS 1504 and a UE 1502 with group level L1/L2 mobility management. FIG. 15 shows, at 1506, a BS 1504 may transmit a L1/L2 mobility configured cell set configuration through RRC signaling to a UE 1502. The configuration may configure one or more groups of cells for L1/L2 mobility management. The L1/L2 mobility configured cell set 602 may be configured to cover a meaningful mobility area. FIG. 15 shows, at 1507, the UE 1502 may transmit an acknowledgment to the BS 1504 upon receiving the L1/L2 mobility configured cell set configuration, where the acknowledgment may indicate that RRC reconfiguration is complete. After transmitting the acknowledgment, the UE 1502 may begin to perform L1 measurements at 1514 and report the L1 measurements to the BS 1504 at 1516.

FIG. 6 shows an L1/L2 mobility activated cell set 604 from the L1/L2 mobility configured cell set 602. For example, referring to FIG. 15, at 1508A, the BS 1504 may transmit L1/L2 signaling to the UE 1502 that activates (e.g., comprises and indication of an activation) a group of cells (e.g., cell group 606). The BS 1504 may transmit the L1/L2 signaling to the UE 1502 at 1508A after 1506 and 1507 described above. In some aspects, the BS 1504 may signal the L1/L2 mobility activated cell set using aspects of the message formats described in the description of FIGS. 13 and 14. The L1/L2 mobility activated cell set 604 includes (at least one) cell group 606 that is activated and that can be readily used for data and control transfer. The cell group 606 (and the L1/L2 mobility activated cell set 604) includes a PCell 608. For example, referring to FIG. 15, at 1512, the BS 1504 transmits an SpCell configuration to the UE 1502 (the PCell may be the SpCell when there is only one cell group). The cell group 606 (and hence the L1/L2 mobility activated cell set 604) may also include one or more SCells 610. The BS 1504 may indicate the PCG and indicate the SpCell within the PCG concurrently, that is, 1510 and 1512 may be performed at the same time.

In one aspect, L1/L2 signaling may be used to activate/deactivate cell groups in the L1/L2 mobility configured cell set 602 and to select beams within the activated cell groups. There may be seamless mobility within the activated cell groups. As a UE changes locations, cell groups from the L1/L2 mobility configured cell set 602 may be deactivated and activated by L1/L2 signaling. For example, the cell groups may be deactivated/activated based upon measurements of signal quality (e.g., reference signal received power (RSRP)) generated by the UE and/or loads on cells within the cell groups. When the UE connects to a cell in a cell group, the UE is connected to each cell within the group (e.g., through CA).

The L1/L2 mobility configured cell set 602 may also include a L1/L2 mobility deactivated cell set 612. For example, referring to FIG. 15, at 1508B, the BS 1504 may indicate an indication of the L1/L2 mobility deactivated cell set to the UE 1502. In other aspects, if a cell group is not activated, the cell group may be in the deactivated cell group set. The BS 1504 may indicate the L1/L2 mobility deactivated cell set in one of the formats described in the description of FIGS. 13 and 14. The L1/L2 mobility deactivated cell set 612 includes at least one cell group that is deactivated and that can be readily activated by L1/L2 signaling. In the example depicted in the diagram 600, the L1/L2 mobility deactivated cell set 612 includes cell group 614, cell group 616, and cell group 618. As will be described in greater detail below, a network entity may add cell groups into the L1/L2 mobility activated cell set 604, remove cell groups from the L1/L2 mobility activated cell set 604, add cell groups into the L1/L2 mobility deactivated cell set 612, and/or remove cell groups from the L1/L2 mobility deactivated cell set 612 using an improved L1/L2 signaling scheme (MAC-CE based or DCI based). Furthermore, as will be described in greater detail below, the network entity may change a PCG within the L1/L2 mobility activated cell set 604 using the improved L1/L2 signaling scheme.

In one aspect, the network entity configures cell groups (e.g., the cell group 606, the cell group 614, the cell group 616, the cell group 618) for L1/L2 mobility using a delta configuration with reference to a reference cell group or reference cell. When the delta configuration is utilized, only differences with respect to the reference cell group or reference cell are specified. In one aspect, one or more SCells in a cell group may be configured with SpCell configuration, that is, one or more SCells in the group may be able to become an SpCell by L1/L2 signaling within an activated cell group.

Figure 7:
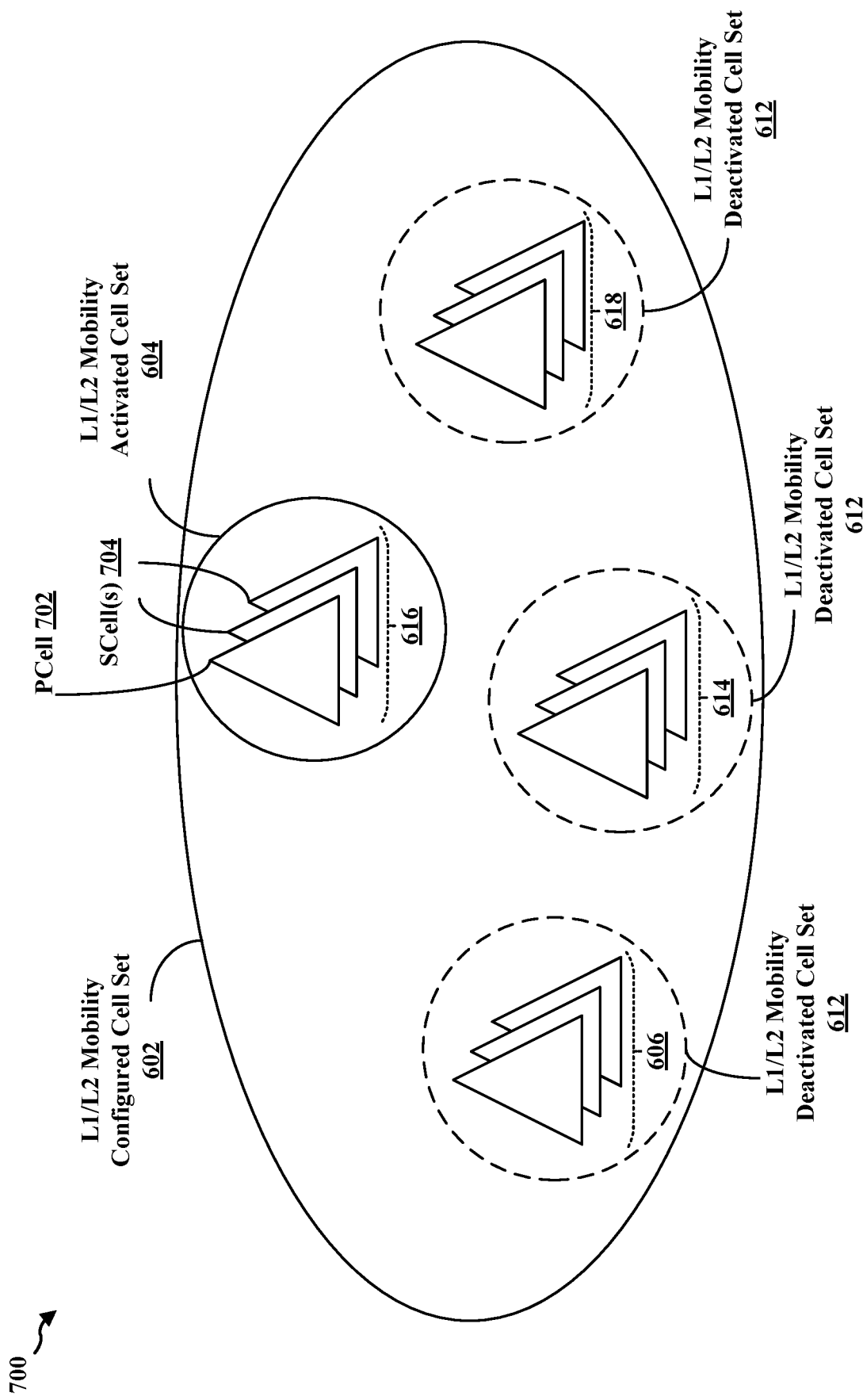
FIG. 7 is a diagram illustrating an example cell configuration.

FIG. 7 is a diagram 700 that illustrates an example cell configuration including group level L1/L2 mobility management. In the diagram 700 (and in comparison to the diagram 600 in FIG. 6), the network entity has removed (e.g., deactivated) the cell group 606 from the L1/L2 mobility activated cell set 604 and added the cell group 606 into the L1/L2 mobility deactivated cell set 612. For example, referring to FIG. 15, at 1508A and 1508B, the BS 1504 may activate/deactivate cell groups within the L1/L2 mobility configured cell set using aspects of the message formats described below in the description of FIGS. 13 and 14. The network entity has added (e.g., activated) the cell group 616 into the L1/L2 mobility activated cell set 604 and removed the cell group 616 from the L1/L2 mobility deactivated cell set 612. Such a change may be referred to as a cell group switch. Removal of the cell group 606 from the L1/L2 mobility activated cell set 604 may be explicit or implicit. The cell group 616 (and hence the L1/L2 mobility activated cell set 604) includes a PCell 702. The cell group 616 (and hence the L1/L2 mobility activated cell set 604) may also include one or more SCells 704. The network entity may perform a cell group switch using the improved L1/L2 signaling scheme (MAC-CE based or DCI based) discussed below.

Figure 8:
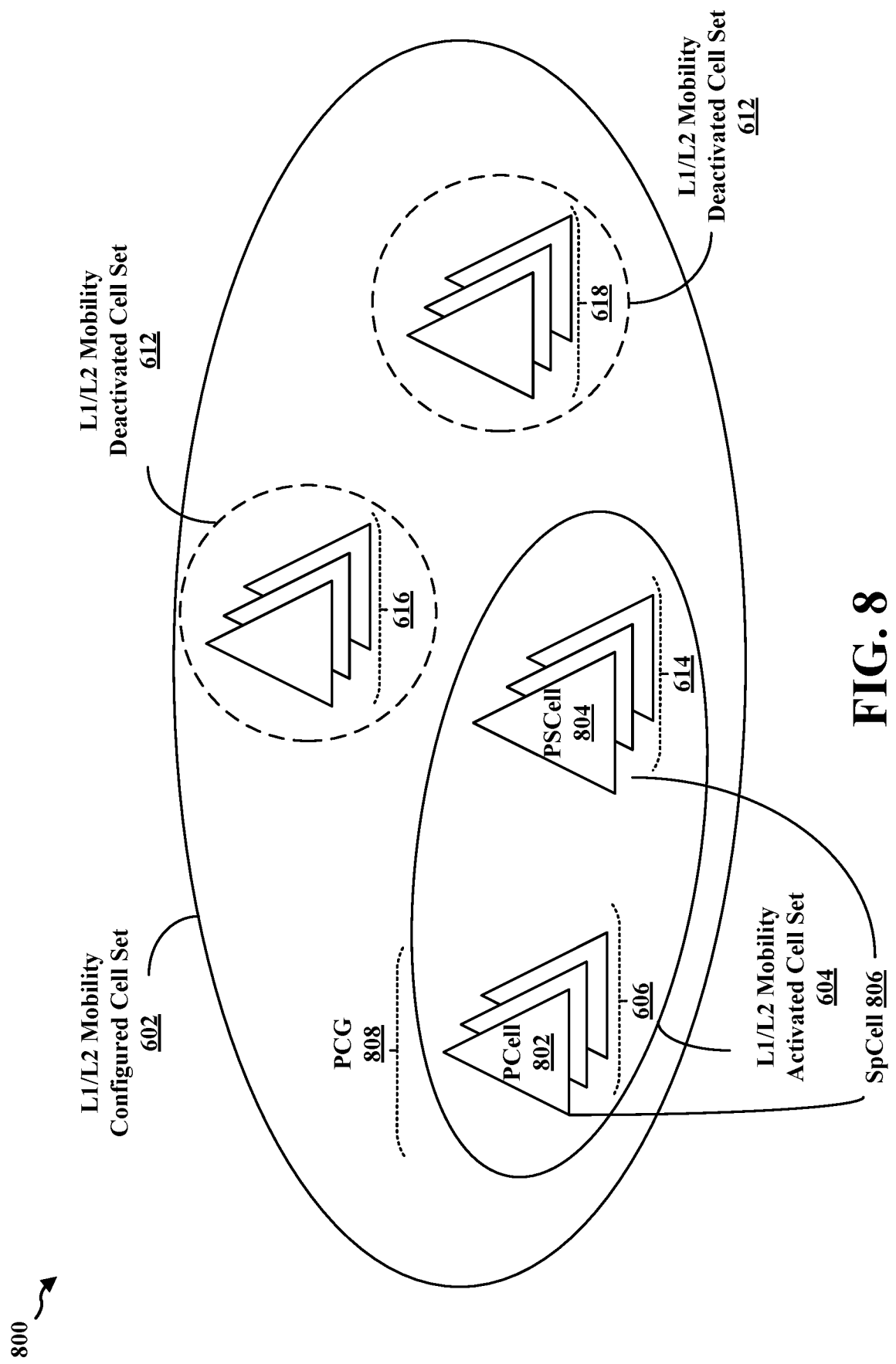
FIG. 8 is a diagram illustrating an example cell configuration.

FIG. 8 is a diagram 800 that illustrates an example cell configuration for group level L1/L2 mobility management. In the diagram 800 (and in comparison to the diagram 600 in FIG. 6), the network entity has added the cell group 614 to the L1/L2 mobility activated cell set 604 and removed the cell group 614 from the L1/L2 mobility deactivated cell set 612. Such a change may be referred to as a cell group update. For example, referring to FIG. 15, at 1508A, the BS 1504 may add cell groups to a L1/L2 mobility activated cell set. At 1510, the BS 1504 may configure a PCG within the L1/L2 mobility activated cell set. The BS 1504 may perform such functionality using aspects of the message formats described below in the description of FIGS. 13 and 14. The removal of the cell group 606 from the L1/L2 mobility deactivated cell set 612 may be explicit or implicit. The BS 1504 may indicate the PCG and indicate the SpCell within the PCG concurrently, that is, 1510 and 1512 may be performed at the same time.

In the example in the diagram 800, the cell group 606 includes a PCell 802 and the cell group 614 includes a PSCell 804 (the combination of which may be referred to as an SpCell 806). The L1/L2 mobility activated cell set 604 includes a PCG 808, where the PCG 808 is a cell group containing the SpCell 806. As will be described in greater detail below, the network entity may perform a cell group update using the improved L1/L2 signaling scheme (MAC-CE based or DCI based).

Figure 9:
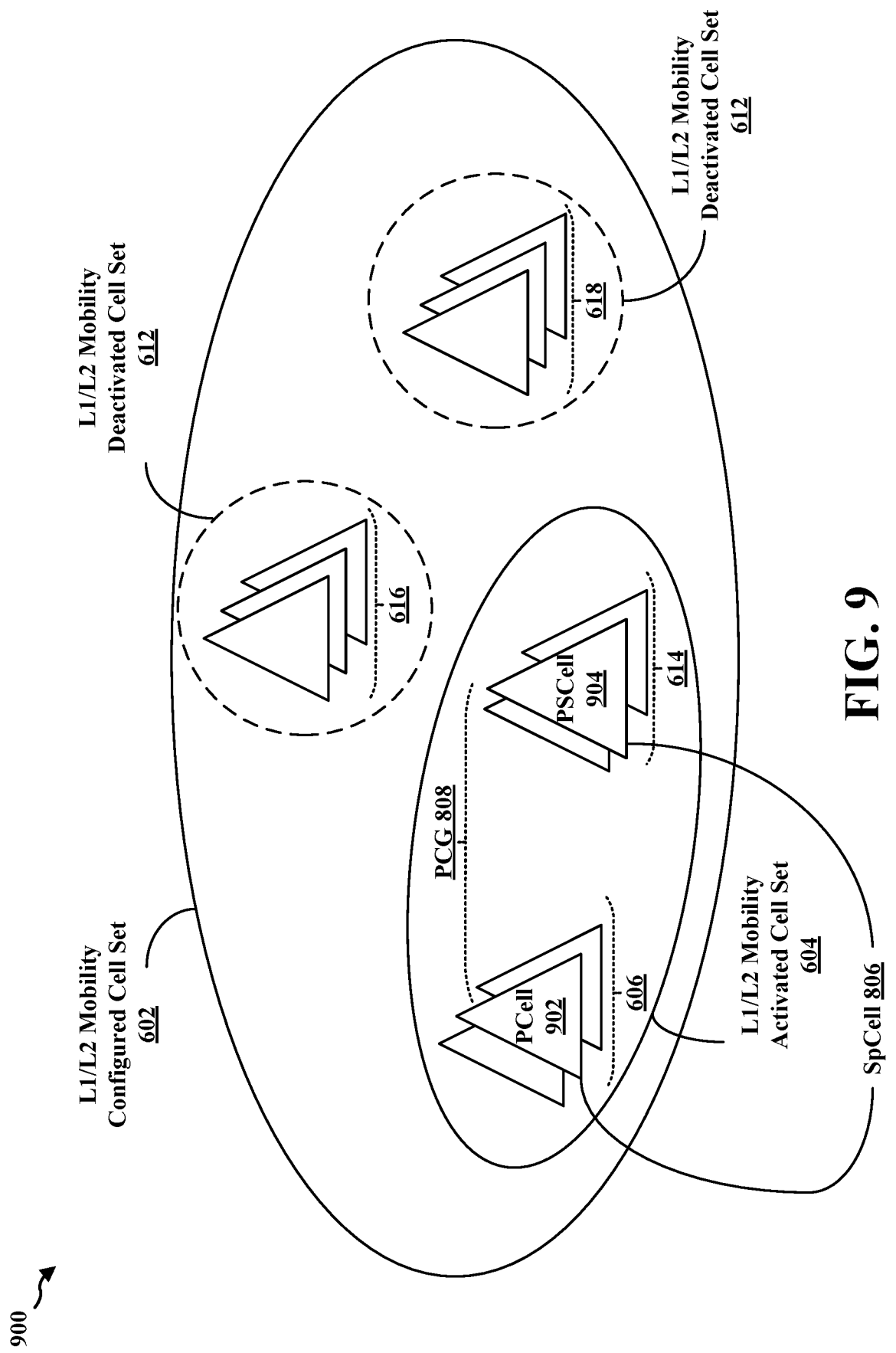
FIG. 9 is a diagram illustrating an example cell configuration.

FIG. 9 is a diagram 900 that illustrates an example cell configuration. In the diagram 900 (and in comparison to the diagram 800 in FIG. 8), the network entity has changed the SpCell 806 within the PCG 808. For example, referring to FIG. 15 at 1512, the base station may activate or otherwise indicate an SpCell within a PCG. The BS 1504 may provide the activation/indication using aspects of the message formats described below in the description of FIGS. 13 and 14. In FIG. 8, the network entity may configure SCells of the cell group 606 and the cell group 614 with individual L1/L2 mobility configurations such that individual cells of the cell group 606 and the cell group 614 have both an SpCell configuration and SCell configuration. In the diagram in FIG. 9, the network entity has configured PCell 902 and PSCell 904 (such cells were previously SCells in FIG. 8). The network entity may select/change the SpCell 806 within the PCG 808 using the improved L1/L2 signaling scheme (MAC-CE based or DCI based) discussed below in the description of FIGS. 13 and 14.

Figure 10:
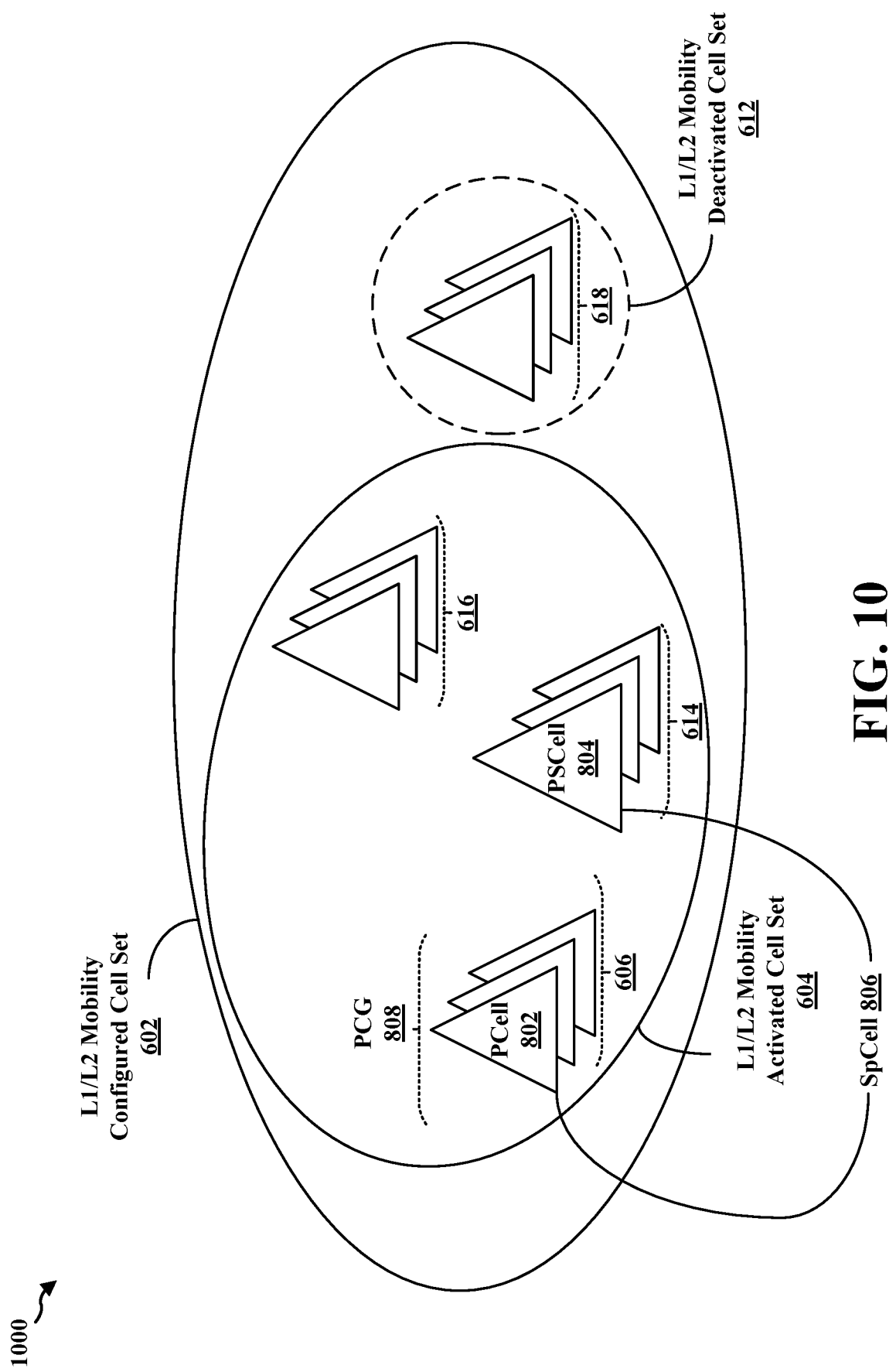
FIG. 10 is a diagram illustrating an example cell configuration.

FIG. 10 is a diagram 1000 that illustrates an example cell configuration for group level L1/L2 mobility management. In the diagram 900 (and in comparison to the diagram 800 in FIG. 8), the network entity has added the cell group 616 to the L1/L2 mobility activated cell set 604 (e.g., and removed the cell group 616 from the L1/L2 mobility deactivated cell set 612). For example, referring to FIG. 15 at 1508A, the BS 1504 may add cell groups to the L1/L2 mobility activated cell set. The BS 1504 may perform such functionality using aspects of the message formats described below in the description of FIGS. 13 and 14. Removal of the cell group 616 from the L1/L2 mobility deactivated cell set 612 may be explicit or implicit. As illustrated in the diagram 1000, the L1/L2 mobility activated cell set 604 may include cell groups (e.g., the cell group 616) that are not included in the PCG 808. The network entity may add/remove cell groups from the L1/L2 mobility activated cell set 604 using the improved L1/L2 signaling scheme (MAC-CE based or DCI based) discussed below.

Figure 11:
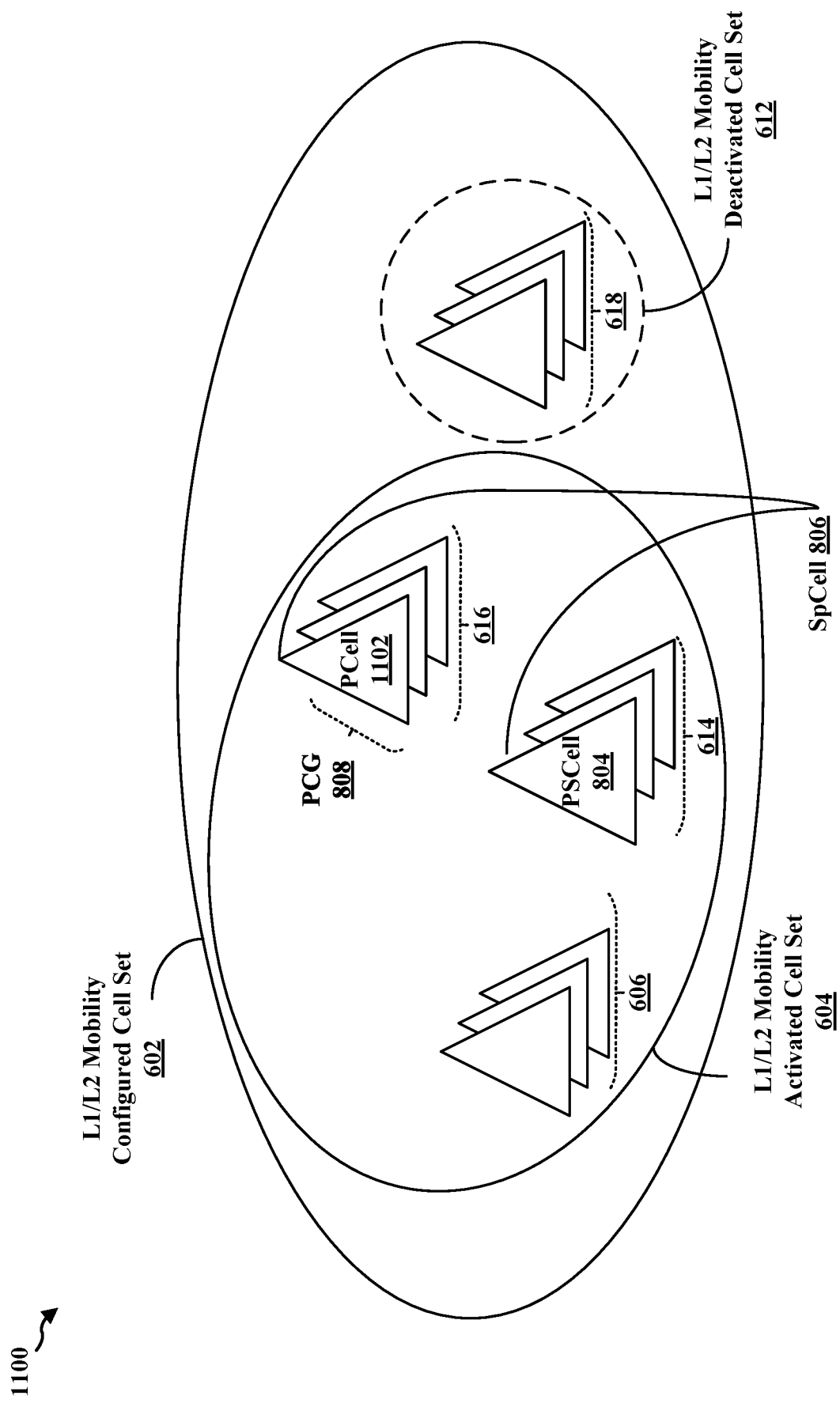
FIG. 11 is a diagram illustrating an example cell configuration.

FIG. 11 is a diagram 1100 that illustrates an example cell configuration. In the diagram 1100 (and in comparison to the diagram 1000 in FIG. 10), the network entity has changed the PCG 808 within the L1/L2 mobility activated cell set 604. For example, referring to FIG. 15, at 1510, the BS 1504 may indicate, e.g., activate, the PCG. The BS 1504 may perform such functionality using aspects of the message formats described below in the description of FIGS. 13 and 14. The PCG 808 now includes the cell group 616 (which includes a PCell 1102). The cell group 614 (which includes the PSCell 804) is an activated SCG. The cell group 606 may be removed from the PCG 808 explicitly or implicitly. As the PCG 808 has been updated, the SpCell 806 has changed. In some aspects, referring to FIG. 15, at 1512, the BS 1504 may indicate the SpCell within the PCG. The network entity may change the PCG and the SpCell within the L1/L2 mobility activated cell set 604 using the improved L1/L2 signaling scheme (MAC-CE based or DCI based) discussed below.

Figure 12:
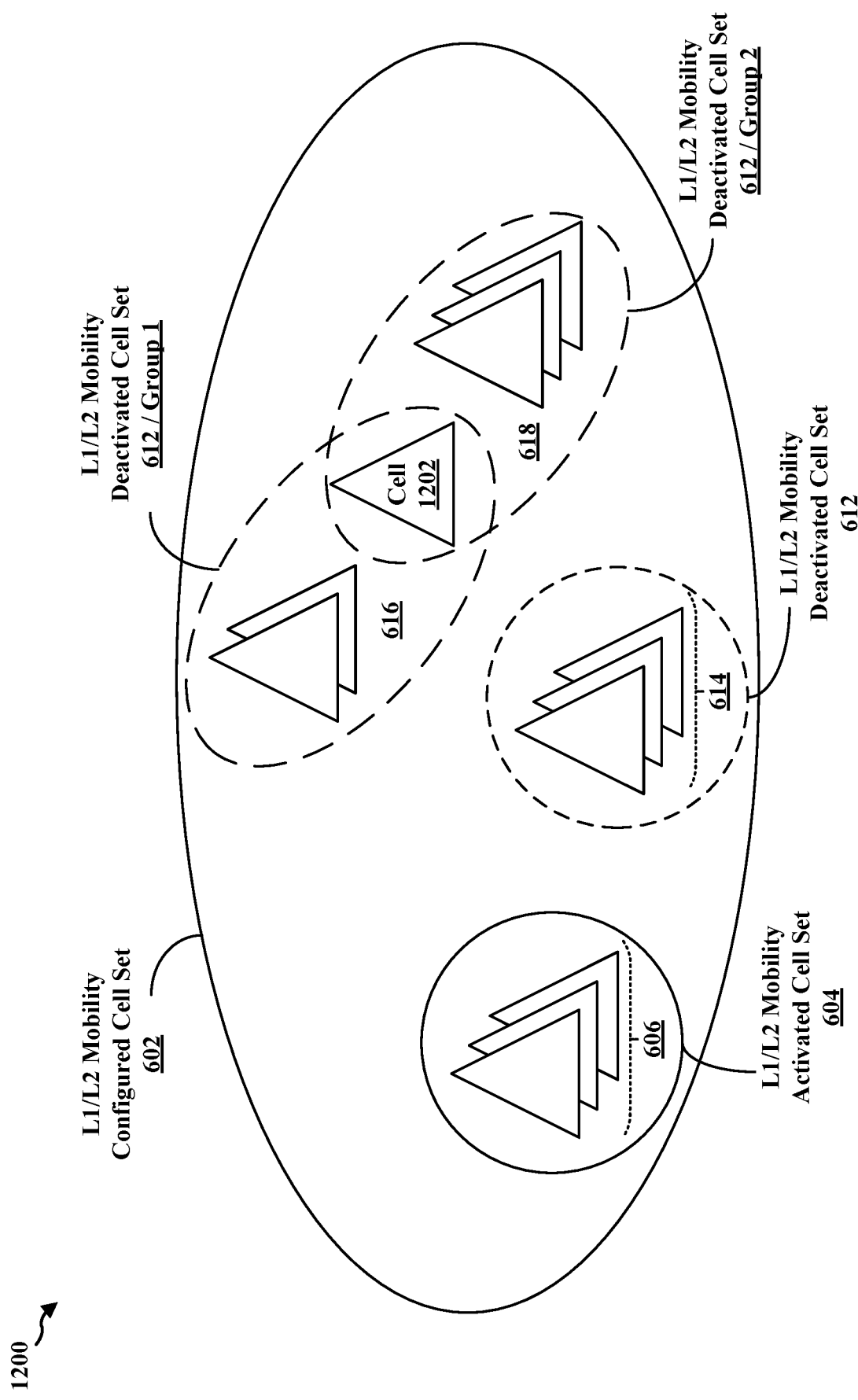
FIG. 12 is a diagram illustrating an example cell configuration.

In some aspects, the base station may configure cell groups that include overlapping cells, e.g., a cell may be included in a configuration of multiple cell groups for L1/L2 mobility. FIG. 12 is a diagram 1200 that illustrates an example cell configuration in which the cell 1202 is included in multiple cell groups. In the diagram 1200, the network entity has configured a cell 1202 to belong to both the cell group 616 (e.g., group 1) and the cell group 618 (e.g., group 2) for L1/L2 mobility.

The L1/L2 signaling that indicates a new PCG and/or that indicates a new SpCell (e.g., PCell and/or PSCell) within the PCG may be provided in a MAC-CE and/or DCI.

Figure 13:
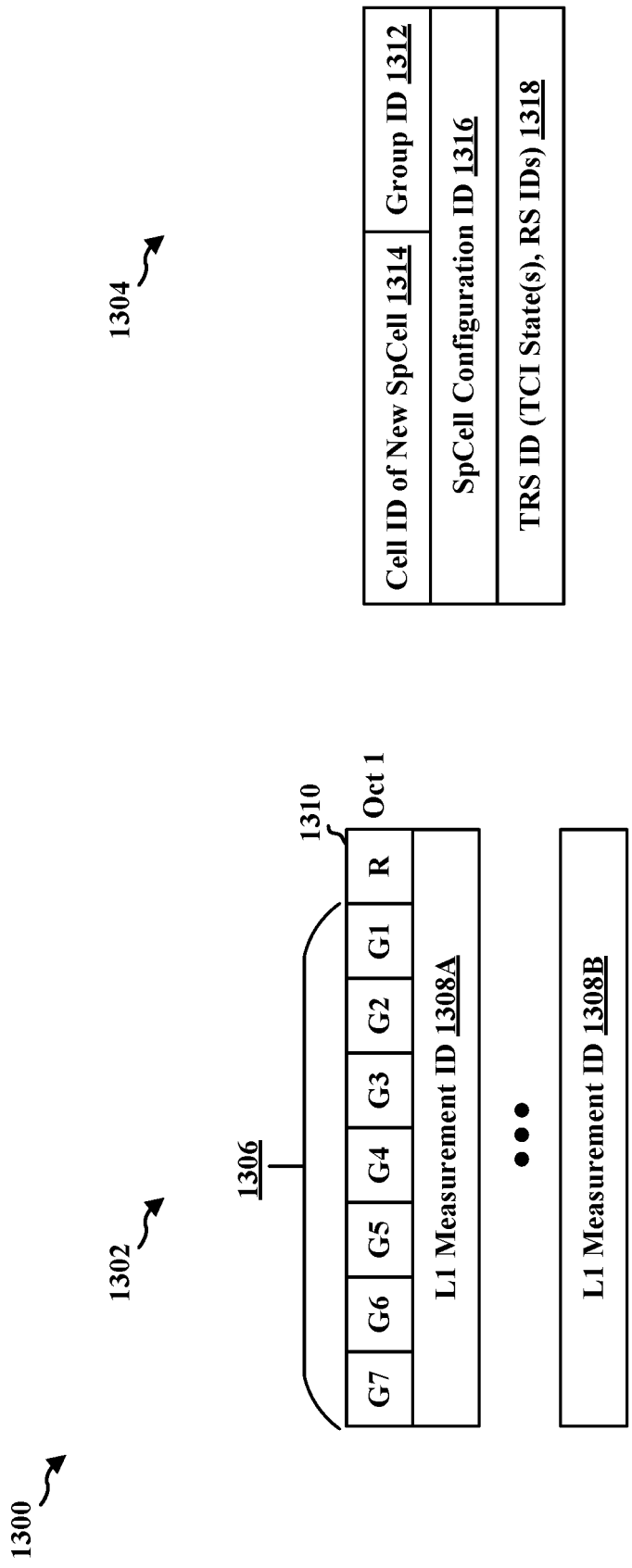
FIG. 13 is a diagram illustrating example messages for layer 1 (L1)/layer 2 (L2) cell group activation and primary cell group (PCG) selection.

FIG. 13 is a diagram 1300 illustrating example messages for L1/L2 cell group activation and PCG selection. The diagram 1300 includes a cell group activation/deactivation message 1302 and a PCG selection message 1304. In one aspect, the cell group activation/deactivation message 1302 and the PCG selection message 1304 may be MAC-CE messages with a logical channel ID (LCID) specific to L1/L2 mobility cell group activation/deactivation. In another aspect, the cell group activation/deactivation message 1302 and the PCG selection message 1304 may be DCI messages. The cell group activation/deactivation message 1302 and the PCG selection message 1304 control an activation status for cell groups that are configured for L1/L2 mobility (e.g., cell groups in the L1/L2 mobility configured cell set 602).

In one aspect, the cell group activation/deactivation message 1302 and the PCG selection message 1304 provide PCG activation/deactivation signaling for activated cell groups configured for L1/L2 mobility (e.g., cell groups within the L1/L2 mobility activated cell set 604). The cell group activation/deactivation message 1302 and the PCG selection message 1304 can utilize L1/L2 signaling for updating PCG designation. In one aspect, the L1/L2 signaling utilized by the cell group activation/deactivation message 1302 and the PCG selection message 1304 to activate a PCG may include a deactivation of a previous PCG from an L1/L2 mobility set. In another aspect, the L1/L2 signaling utilized by the cell group activation/deactivation message 1302 and the PCG selection message 1304 to activate a new PCG may implicitly deactivate a previous PCG from the L1/L2 mobility set.

In one aspect, the cell group activation/deactivation message 1302 and the PCG selection message 1304 include an explicit pointer to a cell group ID being activated as a new PCG or the cell group activation/deactivation message 1302 and the PCG selection message 1304 set a bit in a bitmap corresponding to the new PCG. In one aspect, the cell group activation/deactivation message 1302 and the PCG selection message 1304 include an explicit pointer to an SpCell ID if multiple cells within a cell group are configured with L1/L2 mobility configuration. In one aspect, the cell group activation/deactivation message 1302 and the PCG selection message 1304 may include a pointer to an SpCell configuration to activate if multiple configurations are available for the SpCell or the cell group activation/deactivation message 1302 and the PCG selection message 1304 set a bit in a bitmap corresponding to one of the available SpCell configurations. In one aspect, the cell group activation/deactivation message 1302 and the PCG selection message 1304 may include one or more TCI state(s) to activate for an activated SpCell. In one aspect, the cell group activation/deactivation message 1302 and the PCG selection message 1304 include an indication of an RS for beam refinement. In one aspect, the cell group activation/deactivation message 1302 and the PCG selection message 1304 may include, e.g., indicate, an L1 measurement/reporting configuration for cell groups that are being deactivated (i.e., removed from the L1/L2 mobility activated cell set 604/added to the L1/L2 mobility deactivated cell set 612). The L1 measurement/reporting configuration may be proved when cell groups are newly deactivated.

A network entity (e.g., the base station 102, the base station 310, the network entity 2102) may utilize the cell group activation/deactivation message 1302 and/or the PCG selection message 1304 for any of the purposes discussed above in connection with FIGS. 6-12. For example, referring to FIG. 15, the BS 1504 may transmit the cell group activation/deactivation message 1302 to the UE 1502 at 1508A and/or 1508B and/or the BS 1504 may transmit the PCG selection message 1304 to the UE 1502 at 1510 and/or 1512. The network entity may separately send the cell group activation/deactivation message 1302 and/or the PCG selection message 1304 to a UE (e.g., the UE 104, the UE 350, the apparatus 2004) to add or remove a cell group from the L1/L2 mobility activated cell set 604, to change a PCG within the L1/L2 mobility activated cell set 604, and/or to change the SpCell within the PCG. As the network entity may choose to send one or more of the cell group activation/deactivation message 1302 and the PCG selection message 1304, such messages are useful in conserving network resources in scenarios in which a cell group is to be activated/deactivated (without changing the PCG) or scenarios in which the PCG is to be changed (without activating/deactivating a cell group).

The cell group activation/deactivation message 1302 includes G fields (G1-G7) 1306, where each G field specifies a cell group index that is to be activated or deactivated. In an example, G1 corresponds to the cell group 606 and G2 corresponds to the cell group 614. Each G field in the G fields 1306 may include a bit indicating whether a corresponding cell group is being activated or deactivated. In an example, a G field may include a 0 to indicate that a cell group is being deactivated or a 1 indicate that the cell group is being activated.

The cell group activation/deactivation message 1302 may include L1 measurement/reporting configuration identifiers (IDs) 1308A and 1308B for each cell group that is being deactivated (which are indicated via the G fields 1306). In an example, if the G1 field and the G3 field include bits that indicate that such cell groups are being activated, two octets are included in the measurement/reporting configuration IDs 1308A-1308B. In another example, if the G1 field, the G2 field, and the G3 field include bits that indicate that such cell groups are being activated, three octets are included in the measurement/reporting configuration IDs 1308A-1308B. The cell group activation/deactivation message 1302 may include a reserved bit 1310 that indicates whether the L1 measurement/reporting configuration IDs 1308A-1308B are to be included in the cell group activation/deactivation message 1302. In an example, the reserved bit 1310 may be a 0 to indicate that the L1 measurement/reporting configuration IDs 1308A-1308B are not to be included or a 1 to indicate that the L1 measurement/reporting configuration IDs 1308A-1308B are to be included. The G fields 1306 and the reserved bit 1310 may form an octet. In an example, referring to FIG. 15, at 1514, the UE 1502 may perform L1 measurements based upon data within the cell group activation/deactivation message 1302. At 1516, the UE 1502 may report the L1 measurements to the BS 1504.

The PCG selection message 1304 includes a group ID 1312 that specifies a cell group (e.g., the cell group 606 and the cell group 614) in the activated cell set (e.g., the L1/L2 mobility activated cell set 604) that is selected as the PCG (e.g., the PCG 808). The PCG selection message 1304 may include a cell ID field 1314 that specifies a cell index that is being activated as the SpCell within the PCG. The PCG selection message 1304 may include an SpCell configuration ID 1316. The SpCell configuration ID 1316 may indicate whether the UE is configured with multiple SpCell configurations. The SpCell configuration ID 1316 may use a full octet. The PCG selection message 1304 may include a RS ID 1318 (e.g., for a CSI-RS for tracking). The RS ID 1318 indicates one or more TCI states to activate for the SpCell. The RS ID 1318 also indicates a RS ID that can be utilized by a UE for beam refinement purposes. In an example, when the SpCell is a previously activated cell (i.e., the (newly added) SpCell is in the L1/L2 mobility activated cell set 604 prior to the PCG selection message 1304 being sent), the RS ID 1318 may be omitted from the PCG selection message 1304. In another example, when the SpCell is a deactivated cell (i.e., the (newly activated) SpCell is in the L1/L2 mobility deactivated cell set 612 prior to the PCG selection message 1304 being sent), the RS ID 1318 may be included in the PCG selection message 1304.

In some aspects, the UE may receive separate L1/L2 signaling indicating a group cell activation and a PCG selection. In other aspects, the UE may receive L1/L2 signaling with a joint activation/deactivation of cell groups and a PCG selection.

Figure 14:
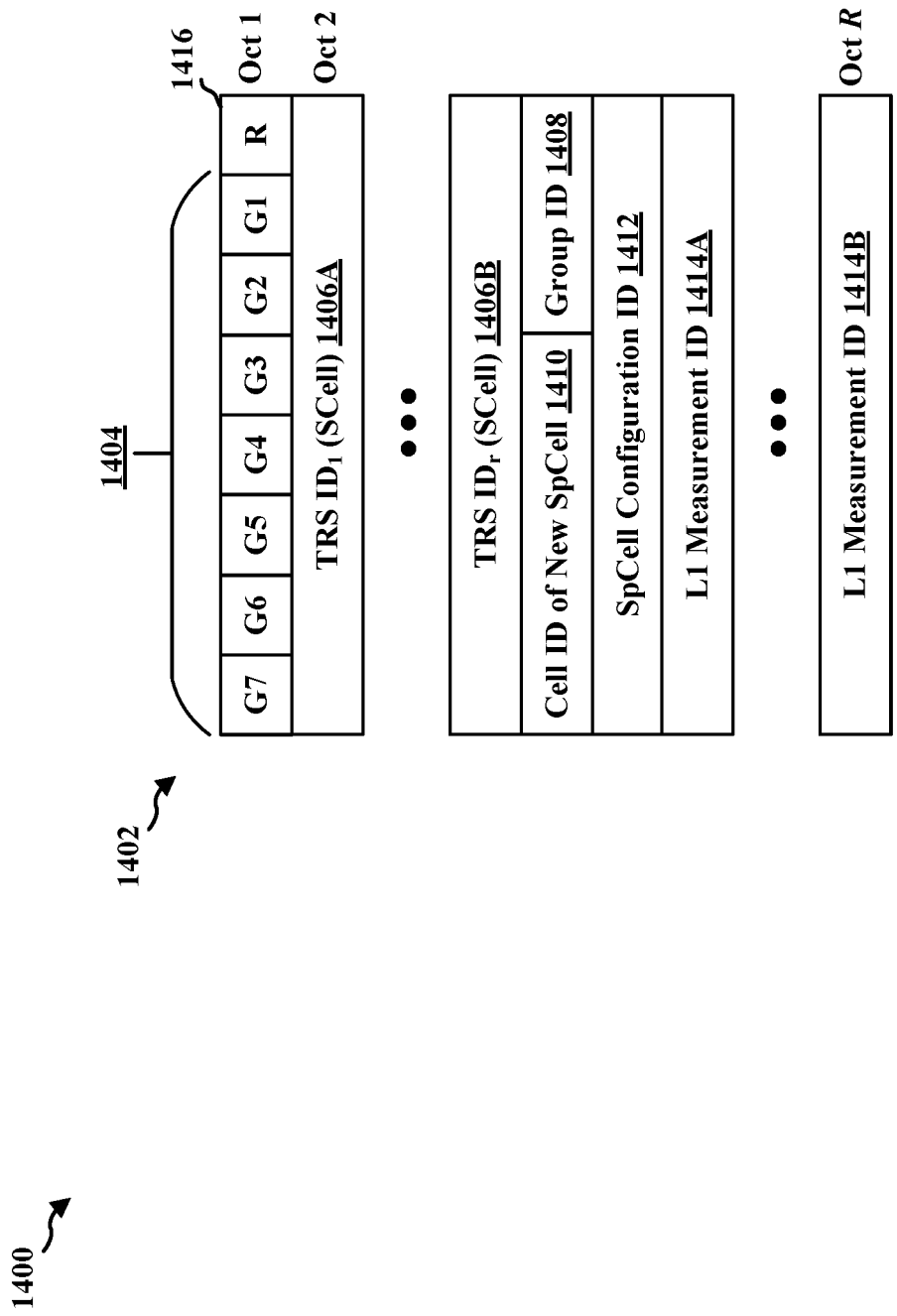
FIG. 14 is a diagram illustrating an example message for L1/L2 cell group activation and PCG selection.

FIG. 14 is a diagram 1400 illustrating an example message for L1/L2 cell group activation and PCG selection. The diagram 1400 includes a joint cell group activation/deactivation and PCG selection message (referred to herein as "the joint message 1402"). The joint message 1402 provides for joint cell group activation/deactivation functionality/signaling and PCG selection for L1/L2 mobility functionality/signaling in a single message. For instance, the joint message 1402 provides for simultaneous cell group activation and PCG designation, as well as simultaneous cell group deactivation and PCG re-designation. The joint message 1402 may also specify/update an SpCell designation within a newly updated PCG.

In one aspect, when a network entity (e.g., the base station 102, the base station 310, the network entity 2102) is not indicating a PCG change and is instead indicating cell group activation/deactivation (i.e., when a cell is being placed into/out of the L1/L2 mobility activated cell set 604 or the L1/L2 mobility deactivated cell set 612), the network entity may send the cell group activation/deactivation message 1302 in place of the joint message 1402. Alternatively, the network entity may utilize a special setting (a reserved bit) in the joint message 1402 specifying that there is no PCG change.

In one aspect, the joint message 1402 may be a MAC-CE message with an LCID dedicated for L1/L2 mobility cell group activation/deactivation and PCG activation. In another aspect, the joint message 1402 is a DCI message. In one aspect, the joint message 1402 may include a pointer to a cell group ID being activated/deactivated or the joint message 1402 sets a bit in a bitmap corresponding to the cell group ID. In one aspect, the joint message 1402 may include an indication as to which cell group in an activated cell set (e.g., the L1/L2 mobility activated cell set 604) is being updated as the new PCG (if there is a PCG update). In one aspect, the joint message 1402 may include an indication as to which cell is being updated as the SpCell (if there is a SpCell update/change within the PCG). In one aspect, the joint message 1402 may include a pointer to an SpCell configuration (alternatively referred to as an spCellConfig) to activate if multiple configurations are available or the joint message 1402 sets a bit in a bitmap corresponding to one of the available SpCell configurations. In one aspect, the joint message 1402 includes one or more TCI states to activate for each activated cell group. In one aspect, the joint message 1402 includes RSs for beam refinement. In one aspect, the joint message 1402 includes L1 measurement/reporting configuration for cell groups that are being deactivated (i.e., removed from the L1/L2 mobility activated cell set 604/added to the L1/L2 mobility deactivated cell set 612). The L1 measurement/reporting configuration may be proved when cell groups are newly deactivated.

A network entity (e.g., the base station 102, the base station 310, the network entity 2102) may utilize the joint message 1402 for any of the purposes discussed above in connection with FIGS. 6-12. The joint message 1402 may be useful in scenarios in which a cell group is to be activated/deactivated and the PCG is to be updated. For example, referring to FIG. 15, the BS 1504 may transmit the joint message 1402 to the UE 1502 at 1508A and/or 1508B and/or the BS 1504 may transmit the joint message 1402 to the UE 1502 at 1510 and/or 1512.

The joint message 1402 may include G fields (G1-G7) 1404, where each G field indicates a deactivated cell group index or an activated cell group index. In an example, G1 corresponds to the cell group 606 and G2 corresponds to the cell group 614. Each G field may include a bit indicating whether a corresponding cell group is activated or deactivated. In an example, the G1 field may include a 1 to indicate that the cell group 606 is activated and the G2 field may include a 0 to indicate that the cell group 614 is deactivated. Of the activated cell groups (i.e., cell groups within the L1/L2 mobility activated cell set 604), one cell group may be designated to be a new PCG.

The joint message 1402 includes a number of octets (R octets) designated to reference cell groups configured for L1/L2 mobility. The number of octets may correspond to a maximum number of cell groups that can be configured for L1/L2 mobility, an overall number of configured cell groups, or a maximum number of cell groups that can be configured for a UE. For each activated cell (cell subset of size r) that was deactivated, the joint message 1402 includes an eight-bit RS ID field 1406A and 1406B (e.g., indicating a CSI-RS for tracking) that points to cell group level additional activated cell configuration (e.g., which beam to use, which reference signals to use, etc.). The RS ID field 1406A-1406B may include a list of TRS configuration for each cell in a respective group.

For the updated PCG, the joint message 1402 may include extra octets of information attached therein. The extra octets may include a group ID 1408 of a newly designated PCG. The group ID 1408 may be X bits in length, with X being an integer number. The extra octets may include a cell ID 1410 corresponding to a cell within the newly designated PCG that is to become the SpCell. The cell ID 1410 may be Y bits in length, with Y being an integer number. The extra octets may include an SpCell configuration ID 1412 that points to a specific RRC configuration if multiple SpCell configurations are configured for a UE. The SpCell configuration ID 1412 may be Z bits in length, with Z being an integer number. The group ID 1408, the cell ID 1410, and the SpCell configuration ID 1412 may occupy separate octets with zero or more reserved bits.

The joint message 1402 may include L1 measurement/reporting configuration IDs 1414A and 1414B for each cell group that is being deactivated. The L1 measurement/reporting configuration IDs may be in increasing order corresponding to cell group IDs. Each of the L1 measurement/reporting configuration IDs may point to a specific L1 measurement and reporting configuration for a cell group. The L1 measurement/reporting configuration IDs may include a list of associations between cells within a cell group and corresponding L1 measurement and reporting configurations. For example, referring to FIG. 15, at 1514, the UE 1502 may perform L1 measurements based upon data within the joint message 1402. At 1516, the UE 1502 may report the L1 measurements to the BS 1504.

The joint message 1402 may include a reserved bit 1416 that indicate whether the joint message 1402 includes a PCG update. In an example, the reserved bit 1416 is 1 when the joint message 1402 includes the PCG update and 0 when then joint message 1402 does not include the PCG update. The reserved bit 1416 may also imply as to whether octet(s) referring to the PCG are present in the joint message 1402. The G fields 1404 and the reserved bit 1416 may form an octet.

Figure 16:
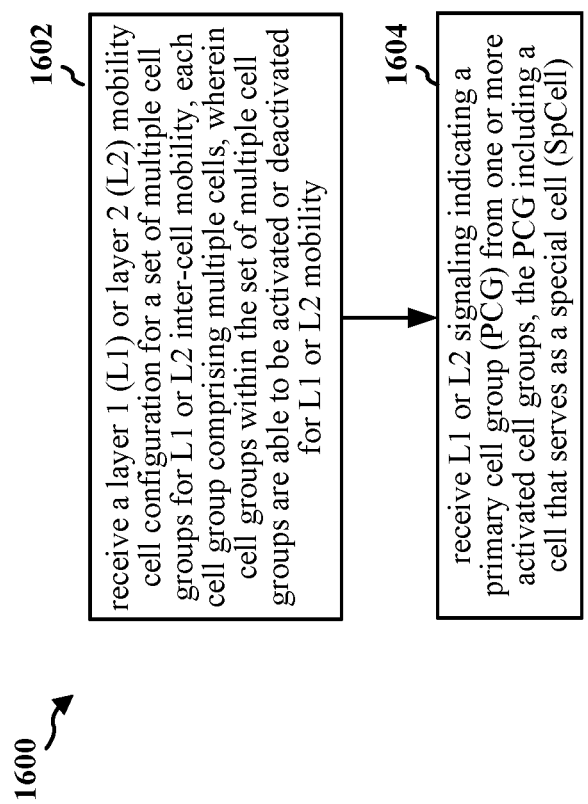
FIG. 16 is a flowchart of a method of wireless communication.

FIG. 16 is a flowchart 1600 of a method of wireless communication. The method may be performed by a UE (e.g., the UE 104, the UE 350, the UE 1502, the apparatus 2004). In an example, the method (including the various configurations described below) may be performed by the L1/L2 mobility component 198. The method may be associated with various advantages for the UE, such as more rapid change of an SpCell in comparison to RRC-based signaling approaches.

At 1602, the UE receives a L1 or L2 mobility cell configuration for a set of multiple cell groups for L1 or L2 inter-cell mobility, each cell group comprising multiple cells, where cell groups within the set of multiple cell groups are able to be activated or deactivated for L1 or L2 mobility. For example, referring to FIG. 15, at 1506, the UE 1502 receives a L1/L2 mobility configured cell set configuration. In another example, referring to FIG. 6, the L1 or L2 mobility cell configuration may configure the L1/L2 mobility configured cell set 602.

At 1604, the UE receives L1 or L2 signaling indicating a PCG from one or more activated cell groups, the PCG including a cell that serves as a SpCell. For example, referring to FIG. 15, at 1510, the UE 1502 receives a PCG configuration from the BS 1504. In another example, referring to FIG. 15, at 1512, the UE 1502 receives an SpCell configuration within the PCG from the BS 1504. In yet another example, referring to FIG. 8, the L1 or L2 signaling may indicate the PCG 808 from the L1/L2 mobility activated cell set 604.

Figure 17:
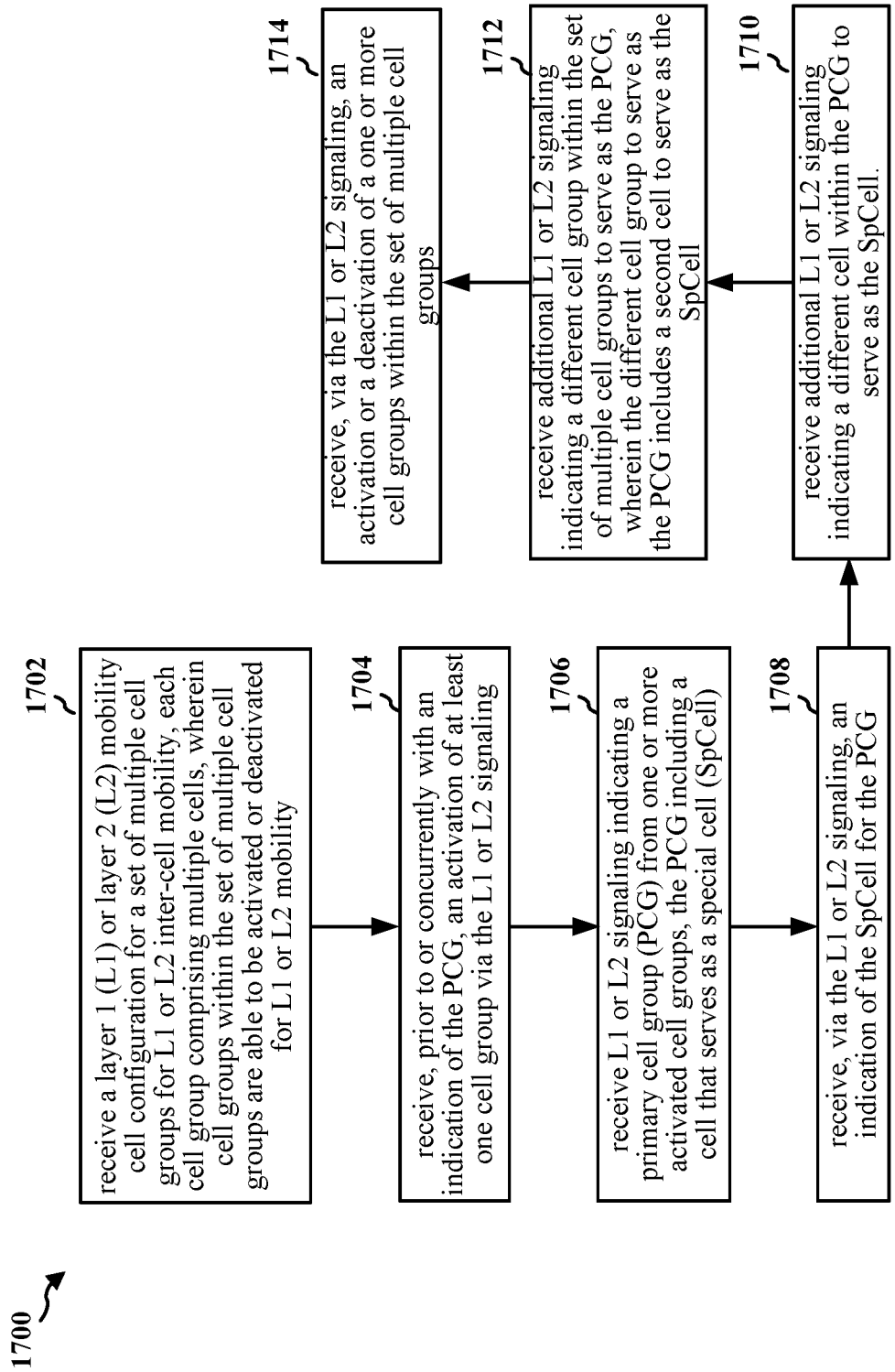
FIG. 17 is a flowchart of a method of wireless communication.

FIG. 17 is a flowchart 1700 of a method of wireless communication. The method may be performed by a UE (e.g., the UE 104, the UE 350, the UE 1502, the apparatus 2004). In an example, the method (including the various configurations described below) may be performed by the L1/L2 mobility component 198. The method may be associated with various advantages for the UE, such as more rapid change of an SpCell in comparison to RRC-based signaling approaches.

At 1702, the UE receives a L1 or L2 mobility cell configuration for a set of multiple cell groups for L1 or L2 inter-cell mobility, each cell group comprising multiple cells, where cell groups within the set of multiple cell groups are able to be activated or deactivated for L1 or L2 mobility. For example, referring to FIG. 15, at 1506, the UE 1502 receives a L1/L2 mobility configured cell set configuration. In another example, referring to FIG. 6, the L1 or L2 mobility cell configuration may configure the L1/L2 mobility configured cell set 602.

At 1706, the UE receives L1 or L2 signaling indicating a PCG from one or more activated cell groups, the PCG including a cell that serves as a SpCell. For example, referring to FIG. 15, at 1510, the UE 1502 receives a PCG configuration from the BS 1504. In another example, referring to FIG. 15, at 1512, the UE 1502 receives an SpCell configuration within the PCG from the BS 1504. In another example, referring to FIG. 8, the L1 or L2 signaling may indicate the PCG 808 from the L1/L2 mobility activated cell set 604.

In one configuration, at 1708, the UE may receive, via the L1 or L2 signaling, an indication of the SpCell for the PCG. In an example, referring to FIG. 15, at 1512, the UE 1502 receives an SpCell configuration within the PCG from the BS 1504. In another example, referring to FIG. 8, the UE may receive an indication of the SpCell 806. Such a configuration may allow for a more rapid change in the SpCell in comparison to RRC-based approaches.

In one configuration, the L1 or L2 signaling may further indicate at least one of: a cell group ID for an activation of a cell group, a bitmap indicating the activation or a deactivation of one or more cell groups, a cell ID for the SpCell, an SpCell configuration, a transmission configuration indicator (TCI) state for the SpCell, a reference signal for beam refinement, an L1 measurement configuration for one or more deactivated cells, or an L1 report configuration for the one or more deactivated cells. For example, referring to FIG. 13, the L1 or L2 signaling may include a cell group activation/deactivation message 1302 that includes G fields 1306 and measurement/reporting configuration IDs 1308A-1308B and a PCG selection message 1304 that includes a cell ID field 1314, a group ID 1312, a SpCell configuration ID 1316, and a TRS ID 1318. In another example, referring to FIG. 14, the L1 or L2 signaling may include a joint message 1402 that includes G fields 1404, a TRS ID field 1406A-1406B, a cell ID 1410, a group ID 1408, a SpCell configuration ID 1412, and L1 measurement/reporting configuration IDs 1414A-1414B.

In one configuration, at 1710, the UE may receive additional L1 or L2 signaling indicating a different cell within the PCG to serve as the SpCell. For example, referring to FIG. 9, a UE may receive additional L1 or L2 signaling that causes the PCell 902 and/or the PSCell 904 to serve as the SpCell 806. Such a configuration may allow for a more rapid change in the SpCell in comparison to RRC-based approaches.

In one configuration, the SpCell may comprise a PCell or a PSCell. For example, referring to FIG. 5, the SpCell 526 may include the PCell 510 or the PSCell 518.

In one configuration, at 1704, the UE may receive prior to or concurrently with an indication of the PCG, an activation of at least one cell group via the L1 or L2 signaling. For example, referring to FIG. 15, at 1508A, the UE 1502 may receive a L1/L2 mobility activated cell set configuration. In another example, referring to FIG. 6, the UE may receive an activation of the L1/L2 mobility activated cell set 604. In yet another example, referring to FIG. 13, the activation of the at least one cell group may be performed via the cell group activation/deactivation message 1302. In a further example, referring to FIG. 14, the activation of the at least one cell group may be performed via the joint message 1402.

In one configuration, the activation of the at least one cell group and the indication of the PCG may be received in one or more of MAC-CE or DCI. For example, referring to FIG. 13, the cell group activation/deactivation message 1302 and the PCG selection message 1304 may be a MAC-CE message or a DCI message. In another example, referring to FIG. 14, the joint message 1402 may be a MAC-CE message or a DCI message.

In one configuration, the activation of the at least one cell group may be received in a first MAC-CE or a first DCI message and the PCG is indicated in a second MAC-CE message or a second DCI message. For example, referring to FIG. 13, the cell group activation/deactivation message 1302 may be the first MAC-CE message or the first DCI message and the PCG selection message 1304 may be the second MAC-CE message or the second DCI message. The cell group activation/deactivation message 1302 may be useful in scenarios in which cell group activation/deactivation is performed without a change in the PCG. The PCG selection message 1304 may be useful in scenarios in which the PCG is changed/updated without a corresponding activation/deactivation of a cell group.

In one configuration, the activation of the at least one cell group and the indication of the PCG may be received in a single MAC-CE message or a single DCI message. For example, referring to FIG. 14, the joint message 1402 may be a single MAC-CE message or a single DCI message. The joint message 1402 may be useful in scenarios in which both cell group activation/deactivation and PCG indication are performed, as a single message can cause both cell group activation/deactivation and PCG indication to be performed simultaneously.

In one configuration, the activation of the at least one cell group may be comprised in a message that includes a plurality of fields each corresponding to a different cell group within the set of multiple cell groups, where at least one bit in the plurality of fields indicates that the at least one cell group is being activated. For example, referring to FIG. 13, the cell group activation/deactivation message 1302 may include G fields 1306 that include bits that indicate whether a cell group is being activated. In another example, referring to FIG. 14, the joint message 1402 may include G fields 1404 that include bits that indicate whether a cell group is being activated.

In one configuration, the message further may indicate an L1 measurement reporting configuration for at least one deactivated cell group. For example, referring to FIG. 13, the cell group activation/deactivation message 1302 may include measurement/reporting configuration IDs 1308A-1308B for deactivated cell groups.

In one configuration, the activation of the at least one cell group may be comprised in a message that includes a number of octets corresponding to a first maximum number of cell groups configured for the L1 or L2 mobility, an overall number of cell groups configured for the L1 or L2 mobility, or a second maximum number of cell groups that can be configured for the L1 or L2 mobility for the UE. For example, referring to FIG. 14, the joint message 1402 may include a number of octets corresponding to a first maximum number of cell groups configured for the L1 or L2 mobility, an overall number of cell groups configured for the L1 or L2 mobility, or a second maximum number of cell groups that can be configured for the L1 or L2 mobility for the UE In one configuration, the activation of the at least one cell group may be comprised in a message that further includes at least one of a CSI-RS for tracking or a CSI-RS configuration for each deactivated cell group. For example, referring to FIG. 13, the PCG selection message 1304 may include a TRS-ID field that includes CSI-RS for tracking or a CSI-RS configuration for each deactivated cell group.

In one configuration, the L1 or L2 signaling may include: a first identifier for the PCG, a second identifier for the SpCell, and a third identifier for an SpCell configuration. For example, referring to FIG. 13, the PCG selection message 1304 may include a group ID 1312 for a cell group that is to serve as the PCG, a cell ID field 1314 that specifies a cell index that is being activated as the SpCell within the PCG, and a SpCell configuration ID 1316. In another example, referring to FIG. 14, the joint message 1402 may include a group ID 1408 for a cell group that is to serve as the PCG, a cell ID 1410 corresponding to a cell within the newly designated PCG that is to become the SpCell, and a SpCell configuration ID 1412.

In one configuration, the PCG may be indicated in a message that includes one or more of: a first identifier for a cell group to serve as the PCG, a second identifier for the cell to serve as the SpCell, and a third identifier for SpCell configuration. For example, referring to FIG. 13, the PCG selection message 1304 may include a group ID 1312 for a cell group that is to serve as the PCG, a cell ID field 1314 that specifies a cell index that is being activated as the SpCell within the PCG, and a SpCell configuration ID 1316. In another example, referring to FIG. 14, the joint message 1402 may include a group ID 1408 for a cell group that is to serve as the PCG, a cell ID 1410 corresponding to a cell within the newly designated PCG that is to become the SpCell, and a SpCell configuration ID 1412.

In one configuration, at 1712, the UE may receive additional L1 or L2 signaling indicating a different cell group within the set of multiple cell groups to serve as the PCG, wherein the different cell group to serve as the PCG includes a second cell to serve as the SpCell. For example, referring to FIG. 11, the UE may receive additional L1 or L2 signaling that changes the PCG 808 to include cell group 614 and cell group 616, where the PCG 808 now includes a PCell 1102 and a PSCell 804 that serve as the SpCell.

In one configuration, at 1714, the UE may receive, via the L1 or L2 signaling, an activation or a deactivation of a one or more cell groups within the set of multiple cell groups. For example, referring to FIG. 7, the UE may receive, via the L1 or L2 signaling, a deactivation of cell group 606 and an activation of cell group 616. In another example, referring to FIG. 8, the UE may receive, via the L1 or L2 signaling, an activation of cell group 614.

Figure 18:
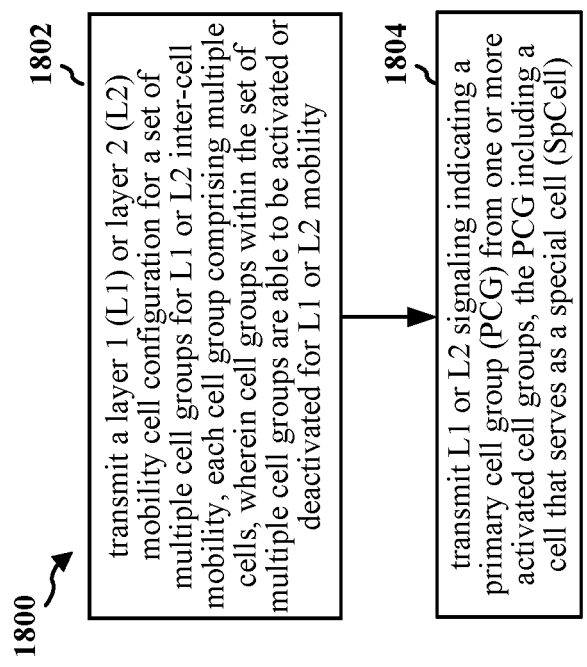
FIG. 18 is a flowchart of a method of wireless communication.

FIG. 18 is a flowchart 1800 of a method of wireless communication. The method may be performed by a network node (e.g., the base station 102; the BS 1504, the network entity 2002). In an example, the method (including the various configurations described below) may be performed by the L1/L2 mobility component 199. The method may be associated with various advantages for the network node, such as more rapid change of an SpCell for a UE in comparison to RRC-based signaling approaches.

At 1802, the network node transmits a L1 or L2 mobility cell configuration for a set of multiple cell groups for L1 or L2 inter-cell mobility, each cell group comprising multiple cells, where cell groups within the set of multiple cell groups are able to be activated or deactivated for L1 or L2 mobility. For example, referring to FIG. 15, at 1506, the BS 1504 transmits a L1/L2 mobility configured cell set configuration. In another example, referring to FIG. 6, the L1 or L2 mobility cell configuration may configure the L1/L2 mobility configured cell set 602.

At 1804, the network node transmits L1 or L2 signaling indicating a PCG from one or more activated cell groups, the PCG including a cell that serves as a SpCell. For example, referring to FIG. 15, at 1510, the BS 1504 transmits a PCG configuration to the UE 1502. In another example, referring to FIG. 15, at 1512, the BS 1504 transmits an SpCell configuration within the PCG to the UE 1502. In yet another example, referring to FIG. 8, the L1 or L2 signaling may indicate the PCG 808 from the L1/L2 mobility activated cell set 604.

Figure 19:
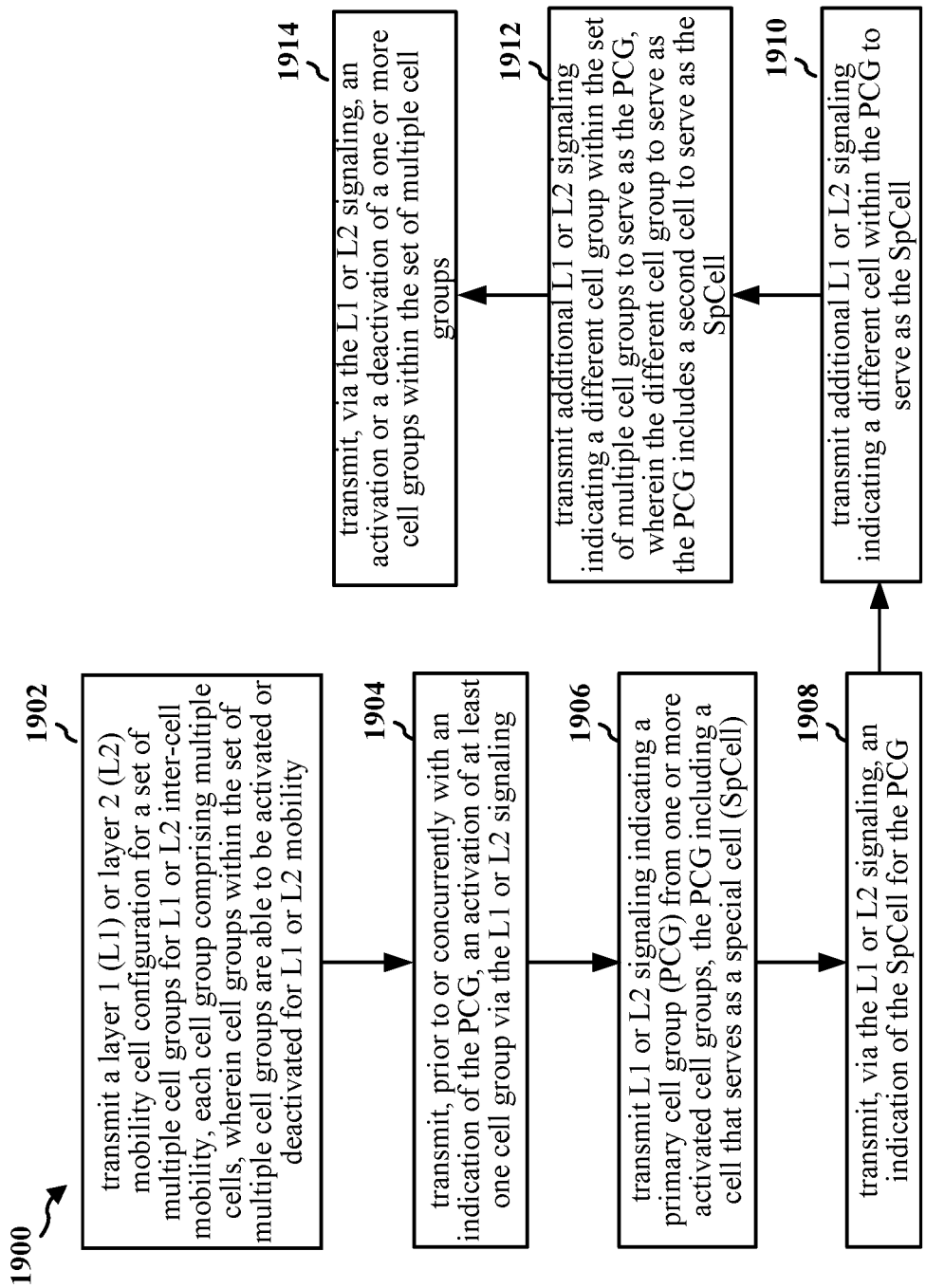
FIG. 19 is a flowchart of a method of wireless communication.

FIG. 19 is a flowchart 1900 of a method of wireless communication. The method may be performed by a network node (e.g., the base station 102; the BS 1504, the network entity 2002). In an example, the method (including the various configurations described below) may be performed by the L1/L2 mobility component 199. The method may be associated with various advantages for the network node, such as more rapid change of an SpCell for a UE in comparison to RRC-based signaling approaches.

At 1902, the network node transmits a L1 or L2 mobility cell configuration for a set of multiple cell groups for L1 or L2 inter-cell mobility, each cell group comprising multiple cells, where cell groups within the set of multiple cell groups are able to be activated or deactivated for L1 or L2 mobility. For example, referring to FIG. 15, at 1506, the BS 1504 transmits a L1/L2 mobility configured cell set configuration. In another example, referring to FIG. 6, the L1 or L2 mobility cell configuration may configure the L1/L2 mobility configured cell set 602.

At 1906, the network node transmits L1 or L2 signaling indicating a PCG from one or more activated cell groups, the PCG including a cell that serves as a SpCell. For example, referring to FIG. 15, at 1510, the BS 1504 transmits a PCG configuration to the UE 1502. In another example, referring to FIG. 15, at 1512, the BS 1504 transmits an SpCell configuration within the PCG to the UE 1502. In yet another example, referring to FIG. 8, the L1 or L2 signaling may indicate the PCG 808 from the L1/L2 mobility activated cell set 604.

In one configuration, at 1908, the network node may transmit, via the L1 or L2 signaling, an indication of the SpCell for the PCG. In an example, referring to FIG. at 1512, the BS 1504 transmits an SpCell configuration within the PCG to the UE 1502. In another example, referring to FIG. 8, the base station may transmit an indication of the SpCell 806. Such a configuration may allow for a more rapid change in the SpCell in comparison to RRC-based approaches.

In one configuration, the L1 or L2 signaling may further indicate at least one of: a cell group ID for an activation of a cell group, a bitmap indicating the activation or a deactivation of one or more cell groups, a cell ID for the SpCell, an SpCell configuration, a TCI state for the SpCell, a reference signal for beam refinement, an L1 measurement configuration for one or more deactivated cells, or an L1 report configuration for the one or more deactivated cells. For example, referring to FIG. 13, the L1 or L2 signaling may include a cell group activation/deactivation message 1302 that includes G fields 1306 and measurement/reporting configuration IDs 1308A-1308B and a PCG selection message 1304 that includes a cell ID field 1314, a group ID 1312, a SpCell configuration ID 1316, and a TRS ID 1318. In another example, referring to FIG. 14, the L1 or L2 signaling may include a joint message 1402 that includes G fields 1404, a TRS ID field 1406A-1406B, a cell ID 1410, a group ID 1408, a SpCell configuration ID 1412, and L1 measurement/reporting configuration IDs 1414A-1414B.

In one configuration, at 1910, the network node may transmit additional L1 or L2 signaling indicating a different cell within the PCG to serve as the SpCell. For example, referring to FIG. 9, a base station may transmit additional L1 or L2 signaling that causes the PCell 902 and/or the PSCell 904 to serve as the SpCell 806. Such a configuration may allow for a more rapid change in the SpCell in comparison to RRC-based approaches.

In one configuration, the SpCell may comprise: a PCell, or a PSCell. For example, referring to FIG. 5, the SpCell 526 may include the PCell 510 or the PSCell 518.

In one configuration, at 1904, the network node may transmit, prior to or concurrently with an indication of the PCG, an activation of at least one cell group via the L1 or L2 signaling. For example, referring to FIG. 15, at 1508A, the BS 1504 may transmit a L1/L2 mobility activated cell set configuration. In another example, referring to FIG. 6, the base station may transmit an activation of the L1/L2 mobility activated cell set 604. In yet another example, referring to FIG. 13, the activation of the at least one cell group may be performed via the cell group activation/deactivation message 1302. In a further example, referring to FIG. 14, the activation of the at least one cell group may be performed via the joint message 1402.

In one configuration, the activation of the at least one cell group and the indication of the PCG may be transmitted in one or more of a MAC-CE or DCI. For example, referring to FIG. 13, the cell group activation/deactivation message 1302 and the PCG selection message 1304 may be a MAC-CE message or a DCI message. In another example, referring to FIG. 14, the joint message 1402 may be a MAC-CE message or a DCI message.

In one configuration, the activation of the at least one cell group may be transmitted in a first MAC-CE or a first DCI message and the PCG is indicated in a second MAC-CE message or a second DCI message. For example, referring to FIG. 13, the cell group activation/deactivation message 1302 may be the first MAC-CE message or the first DCI message and the PCG selection message 1304 may be the second MAC-CE message or the second DCI message. The cell group activation/deactivation message 1302 may be useful in scenarios in which cell group activation/deactivation is performed without a change in the PCG. The PCG selection message 1304 may be useful in scenarios in which the PCG is changed/updated without a corresponding activation/deactivation of a cell group.

In one configuration, the activation of the at least one cell group and the indication of the PCG may be received in a single MAC-CE message or a single DCI message. For example, referring to FIG. 14, the joint message 1402 may be a single MAC-CE message or a single DCI message. The joint message 1402 may be useful in scenarios in which both cell group activation/deactivation and PCG indication are performed, as a single message can cause both cell group activation/deactivation and PCG indication to be performed simultaneously.

In one configuration, the activation of the at least one cell group may be comprised in a message that includes a plurality of fields each corresponding to a different cell group within the set of multiple cell groups, wherein at least one bit in the plurality of fields indicates that the at least one cell group is being activated. For example, referring to FIG. 13, the cell group activation/deactivation message 1302 may include G fields 1306 that include bits that indicate whether a cell group is being activated. In another example, referring to FIG. 14, the joint message 1402 may include G fields 1404 that include bits that indicate whether a cell group is being activated.

In one configuration, the message may further indicate an L1 measurement reporting configuration for at least one deactivated cell group. For example, referring to FIG. 13, the cell group activation/deactivation message 1302 may include measurement/reporting configuration IDs 1308A-1308B for deactivated cell groups.

In one configuration, the activation of the at least one cell group may be comprised in a message that includes a number of octets corresponding to a first maximum number of cell groups configured for the L1 or L2 mobility, an overall number of cell groups configured for the L1 or L2 mobility, or a second maximum number of cell groups that can be configured for the L1 or L2 mobility for a UE. For example, referring to FIG. 14, the joint message 1402 may include a number of octets corresponding to a first maximum number of cell groups configured for the L1 or L2 mobility, an overall number of cell groups configured for the L1 or L2 mobility, or a second maximum number of cell groups that can be configured for the L1 or L2 mobility for the UE In one configuration, the activation of the at least one cell group is comprised in a message that further includes at least one of a CSI-RS for tracking or a CSI-RS configuration for each deactivated cell group.

In one configuration, the L1 or L2 signaling may include: a first identifier for the PCG, a second identifier for the SpCell, and a third identifier for an SpCell configuration. For example, referring to FIG. 13, the PCG selection message 1304 may include a TRS-ID field that includes CSI-RS for tracking or a CSI-RS configuration for each deactivated cell group. For example, referring to FIG. 13, the PCG selection message 1304 may include a group ID 1312 for a cell group that is to serve as the PCG, a cell ID field 1314 that specifies a cell index that is being activated as the SpCell within the PCG, and a SpCell configuration ID 1316. In another example, referring to FIG. 14, the joint message 1402 may include a group ID 1408 for a cell group that is to serve as the PCG, a cell ID 1410 corresponding to a cell within the newly designated PCG that is to become the SpCell, and a SpCell configuration ID 1412.

In one configuration, the PCG may be indicated in a message that includes one or more of: a first identifier for a cell group to serve as the PCG, a second identifier for the cell to serve as the SpCell, and a third identifier for an SpCell configuration. For example, referring to FIG. 13, the PCG selection message 1304 may include a group ID 1312 for a cell group that is to serve as the PCG, a cell ID field 1314 that specifies a cell index that is being activated as the SpCell within the PCG, and a SpCell configuration ID 1316. In another example, referring to FIG. 14, the joint message 1402 may include a group ID 1408 for a cell group that is to serve as the PCG, a cell ID 1410 corresponding to a cell within the newly designated PCG that is to become the SpCell, and a SpCell configuration ID 1412.

In one configuration, at 1912, the network node may transmit additional L1 or L2 signaling indicating a different cell group within the set of multiple cell groups to serve as the PCG, wherein the different cell group to serve as the PCG includes a second cell to serve as the SpCell. For example, referring to FIG. 11, the network node may transmit additional L1 or L2 signaling that changes the PCG 808 to include cell group 614 and cell group 616, where the PCG 808 now includes a PCell 1102 and a PSCell 804 that serve as the SpCell.

In one configuration, at 1914, the network node may transmit, via the L1 or L2 signaling, an activation or a deactivation of a one or more cell groups within the set of multiple cell groups. For example, referring to FIG. 7, the network node may transmit, via the L1 or L2 signaling, a deactivation of cell group 606 and an activation of cell group 616. In another example, referring to FIG. 8, the network node may transmit, via the L1 or L2 signaling, an activation of cell group 614.

Figure 20:
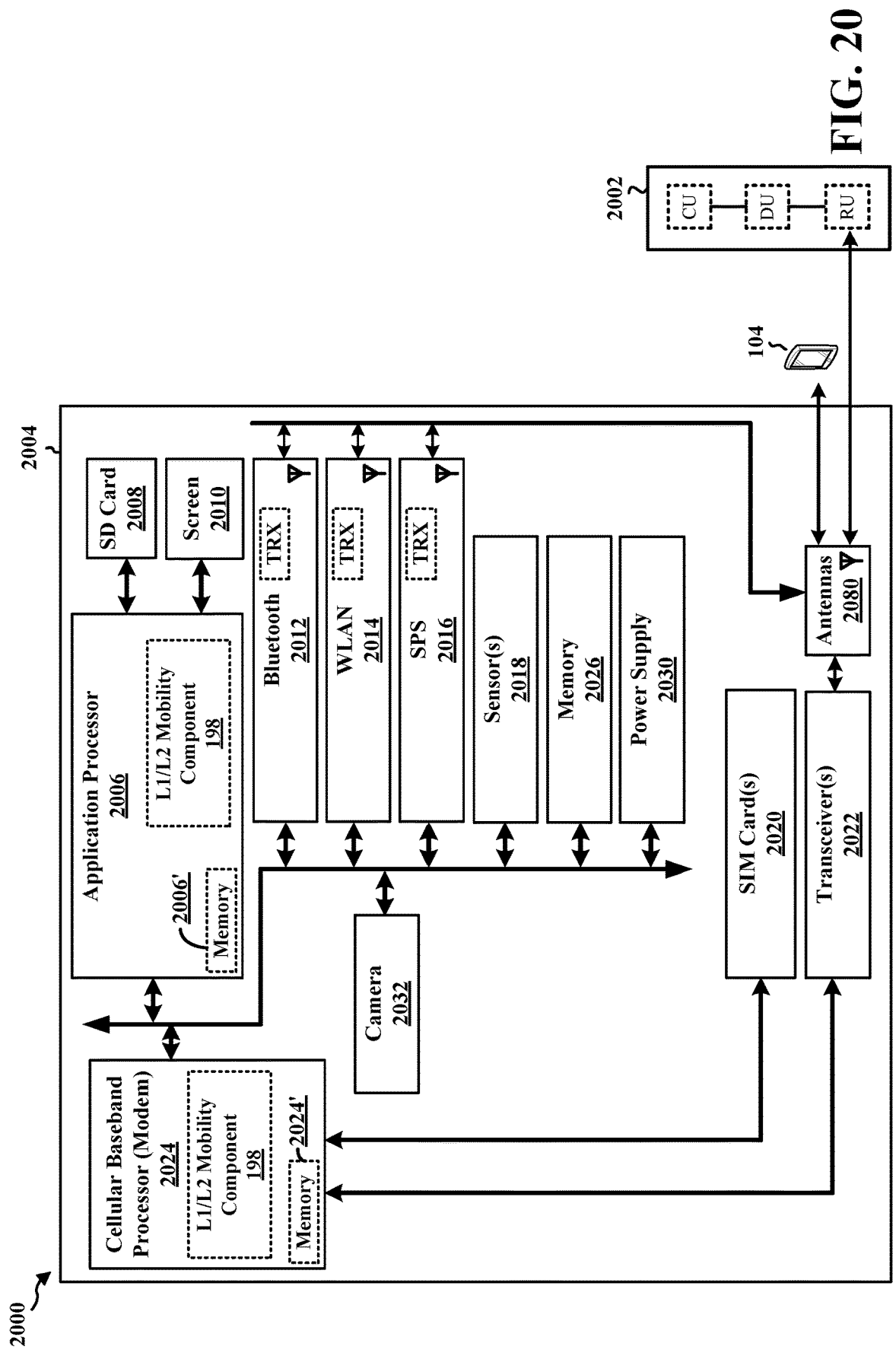
FIG. 20 is a diagram illustrating an example of a hardware implementation for an example apparatus and/or network entity.

FIG. 20 is a diagram 2000 illustrating an example of a hardware implementation for an apparatus 2004. The apparatus 2004 may be a UE, a component of a UE, or may implement UE functionality. In some aspects, the apparatus 2004 may include a cellular baseband processor 2024 (also referred to as a modem) coupled to one or more transceivers 2022 (e.g., cellular RF transceiver). The cellular baseband processor 2024 may include on-chip memory 2024'. In some aspects, the apparatus 2004 may further include one or more subscriber identity modules (SIM) cards 2020 and an application processor 2006 coupled to a secure digital (SD) card 2008 and a screen 2010. The application processor 2006 may include on-chip memory 2006'. In some aspects, the apparatus 2004 may further include a Bluetooth module 2012, a WLAN module 2014, an SPS module 2016 (e.g., GNSS module), one or more sensor modules 2018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2026, a power supply 2030, and/or a camera 2032. The Bluetooth module 2012, the WLAN module 2014, and the SPS module 2016 may include an on-chip transceiver (TRX) (or in some cases, just a receiver (RX)). The Bluetooth module 2012, the WLAN module 2014, and the SPS module 2016 may include their own dedicated antennas and/or utilize the antennas 2080 for communication. The cellular baseband processor 2024 communicates through the transceiver(s) 2022 via one or more antennas 2080 with the UE 104 and/or with an RU associated with a network entity 2002. The cellular baseband processor 2024 and the application processor 2006 may each include a computer-readable medium/memory 2024', 2006', respectively. The additional memory modules 2026 may also be considered a computer-readable medium/memory. Each computer-readable medium/memory 2024', 2006', 2026 may be non-transitory. The cellular baseband processor 2024 and the application processor 2006 are each responsible for general processing, including the execution of software stored on the computer-readable medium/memory. The software, when executed by the cellular baseband processor 2024/application processor 2006, causes the cellular baseband processor 2024/application processor 2006 to perform the various functions described supra. The computer-readable medium/memory may also be used for storing data that is manipulated by the cellular baseband processor 2024/application processor 2006 when executing software. The cellular baseband processor 2024/application processor 2006 may be a component of the UE 350 and may include the memory 360 and/or at least one of the TX processor 368, the RX processor 356, and the controller/processor 359. In one configuration, the apparatus 2004 may be a processor chip (modem and/or application) and include just the cellular baseband processor 2024 and/or the application processor 2006, and in another configuration, the apparatus 2004 may be the entire UE (e.g., see 350 of FIG. 3) and include the additional modules of the apparatus 2004.

As discussed supra, the L1/L2 mobility component 198 is configured to receive a L1 or L2 mobility cell configuration for a set of multiple cell groups for L1 or L2 inter-cell mobility, each cell group comprising multiple cells, wherein cell groups within the set of multiple cell groups are able to be activated or deactivated for L1 or L2 mobility and receive L1 or L2 signaling indicating a PCG from one or more activated cell groups, the PCG including a cell that serves as a SpCell. The L1/L2 mobility component 198 may be further configured to perform any of the aspects described in connection with FIG. 16, FIG. 17, and/or performed by the UE in FIG. 15. The L1/L2 mobility component 198 may be within the cellular baseband processor 2024, the application processor 2006, or both the cellular baseband processor 2024 and the application processor 2006. The L1/L2 mobility component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2004 may include a variety of components configured for various functions. In one configuration, the apparatus 2004, and in particular the cellular baseband processor 2024 and/or the application processor 2006, includes means for receiving a L1 or L2 mobility cell configuration for a set of multiple cell groups for L1 or L2 inter-cell mobility, each cell group comprising multiple cells, wherein cell groups within the set of multiple cell groups are able to be activated or deactivated for L1 or L2 mobility and means for receiving L1 or L2 signaling indicating a PCG from one or more activated cell groups, the PCG including a cell that serves as a SpCell. The apparatus may further include means to perform any of the aspects described in connection with FIG. 16, FIG. 17, and/or performed by the UE in FIG. 15. The means may be the L1/L2 mobility component 198 of the apparatus 2004 configured to perform the functions recited by the means. As described supra, the apparatus 2004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 21:
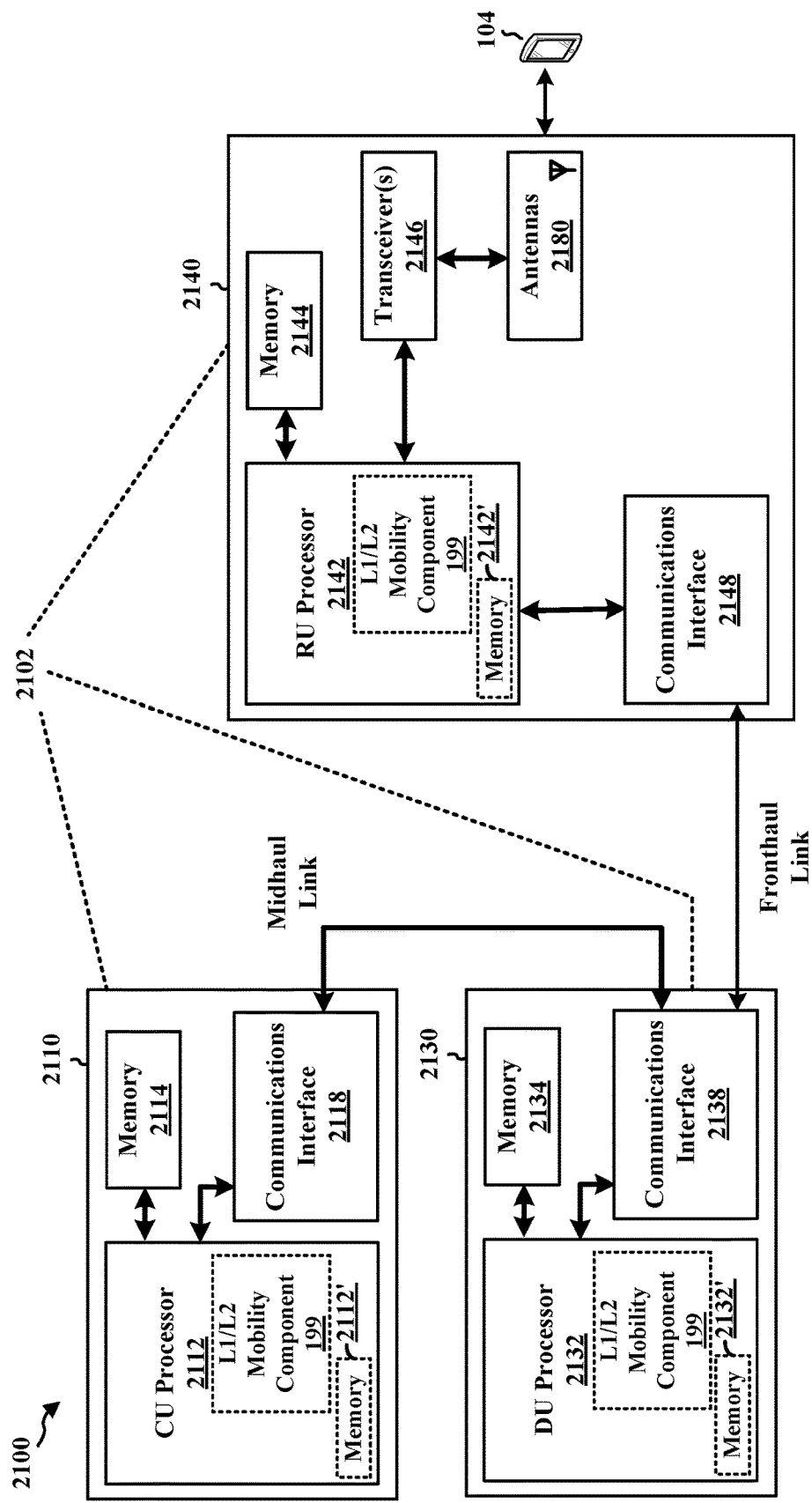
FIG. 21 is a diagram illustrating an example of a hardware implementation for an example network entity.

FIG. 21 is a diagram 2100 illustrating an example of a hardware implementation for a network entity 2102. The network entity 2102 may be a BS, a component of a BS, or may implement BS functionality. The network entity 2102 may include at least one of a CU 2110, a DU 2130, or an RU 2140. For example, depending on the layer functionality handled by the component 199, the network entity 2102 may include the CU 2110; both the CU 2110 and the DU 2130; each of the CU 2110, the DU 2130, and the RU 2140; the DU 2130; both the DU 2130 and the RU 2140; or the RU 2140. The CU 2110 may include a CU processor 2112. The CU processor 2112 may include on-chip memory 2112'. In some aspects, the CU 2110 may further include additional memory modules 2114 and a communications interface 2118. The CU 2110 communicates with the DU 2130 through a midhaul link, such as an F1 interface. The DU 2130 may include a DU processor 2132. The DU processor 2132 may include on-chip memory 2132'. In some aspects, the DU 2130 may further include additional memory modules 2134 and a communications interface 2138. The DU 2130 communicates with the RU 2140 through a fronthaul link. The RU 2140 may include an RU processor 2142. The RU processor 2142 may include on-chip memory 2142'. In some aspects, the RU 2140 may further include additional memory modules 2144, one or more transceivers 2146, antennas 2180, and a communications interface 2148. The RU 2140 communicates with the UE 104. The on-chip memory 2112', 2132', 2142' and the additional memory modules 2114, 2134, 2144 may each be considered a computer-readable medium/memory. Each computer-readable medium/memory may be non-transitory. Each of the processors 2112, 2132, 2142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the L1/L2 mobility component 199 is configured to transmit a L1 or L2 mobility cell configuration for a set of multiple cell groups for L1 or L2 inter-cell mobility, each cell group comprising multiple cells, wherein cell groups within the set of multiple cell groups are able to be activated or deactivated for L1 or L2 mobility and transmit L1 or L2 signaling indicating a PCG from one or more activated cell groups, the PCG including a cell that serves as a SpCell. The L1/L2 mobility component 199 may be further configured to perform any of the aspects described in connection with FIG. 18, FIG. 19, and/or performed by the base station in FIG. 15. The component 199 may be within one or more processors of one or more of the CU 2110, DU 2130, and the RU 2140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2102 may include a variety of components configured for various functions. In one configuration, the network entity 2102 includes means for transmitting a L1 or L2 mobility cell configuration for a set of multiple cell groups for L1 or L2 inter-cell mobility, each cell group comprising multiple cells, wherein cell groups within the set of multiple cell groups are able to be activated or deactivated for L1 or L2 mobility and means for transmitting L1 or L2 signaling indicating a PCG from one or more activated cell groups, the PCG including a cell that serves as a SpCell. The network entity may further include means to perform any of the aspects described in connection with FIG. 18, FIG. 19, and/or performed by the base station in FIG. 15. The means may be the L1/L2 mobility component 199 of the network entity 2102 configured to perform the functions recited by the means. As described supra, the network entity 2102 may include the TX processor 316, the RX processor 370, and the controller/processor 375. As such, in one configuration, the means may be the TX processor 316, the RX processor 370, and/or the controller/processor 375 configured to perform the functions recited by the means.

As noted above, a network entity (e.g., a base station) may change the SpCell using a L3 handover (e.g., using RRC signaling). However, L3 handovers may be time consuming and/or inefficient. A need exists for a mechanism to more rapidly change the SpCell without a degradation in service quality. The improved L1/L2 signaling scheme described above enables the SpCell for a UE to be changed in a more rapid manner in comparison to RRC-based approaches. In an example, a UE receives a L1 or L2 mobility cell configuration for a set of multiple cell groups, each cell group comprising multiple cells, where cell groups within the set of multiple cell groups are able to be activated or deactivated for L1 or L2 mobility. The UE receives L1 or L2 signaling indicating a primary cell group (PCG) from one or more activated cell groups, the PCG including a cell that serves as a special cell (SpCell). Via the aforementioned L1 or L2 signaling, an SpCell (or a PCG) is able to be changed in a manner that avoids RRC-based signaling. As a result, the SpCell may be changed in a more rapid manner in comparison to RRC-based signaling. Furthermore, in some aspects, an activation of the at least one cell group may be received in a first MAC-CE or a first DCI message and the PCG is indicated in a second MAC-CE message or a second DCI message. Such an approach may be advantageous in scenarios in which a cell group is to be activated or a PCG is to be indicated. In an example in which a cell group is to be activated without a corresponding change in the PCG, a UE may receive a first MAC-CE/DCI message without receiving a second MAC-CE/DCI message, thus leading to a conservation of network resources. In other aspects, the activation of the at least one cell group and the indication of the PCG are received in a single MAC-CE message or a single DCI message. Such an approach may be advantageous in scenarios in which a cell group is to be activated and a PCG is to be indicated, as a single MAC-CE/DCI message may enable simultaneous cell group activation/PCG indication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: receiving a layer 1 (L1) or layer 2 (L2) mobility cell configuration for a set of multiple cell groups for L1 or L2 inter-cell mobility, each cell group including multiple cells, where cell groups within the set of multiple cell groups are able to be activated or deactivated for L1 or L2 mobility; and receiving L1 or L2 signaling indicating a primary cell group (PCG) from one or more activated cell groups, the PCG including a cell that serves as a special cell (SpCell).

Aspect 2 is the method of aspect 1, further including: receiving, via the L1 or L2 signaling, an indication of the SpCell for the PCG.

Aspect 3 is the method of any of aspects 1-2, where the L1 or L2 signaling further indicates at least one of: a cell group ID for an activation of a cell group, a bitmap indicating the activation or a deactivation of one or more cell groups, a cell ID for the SpCell, an SpCell configuration, a transmission configuration indicator (TCI) state for the SpCell, a reference signal for beam refinement, an L1 measurement configuration for one or more deactivated cells, or an L1 report configuration for the one or more deactivated cells.

Aspect 4 is the method of any of aspects 1-3, further including: receiving additional L1 or L2 signaling indicating a different cell within the PCG to serve as the SpCell.

Aspect 5 is the method of any of aspects 1-4, where the SpCell includes: a primary cell (PCell), or a primary secondary cell (PSCell).

Aspect 6 is the method of any of aspects 1-5, further including: receiving, prior to or concurrently with an indication of the PCG, an activation of at least one cell group via the L1 or L2 signaling.

Aspect 7 is the method of aspect 6, where the activation of the at least one cell group and the indication of the PCG are received in one or more of a medium access control-control element (MAC-CE) or downlink control information (DCI).

Aspect 8 is the method of aspect 7, where the activation of the at least one cell group is received in a first MAC-CE or a first DCI message and the PCG is indicated in a second MAC-CE message or a second DCI message.

Aspect 9 is the method of aspect 7, where the activation of the at least one cell group and the indication of the PCG are received in a single MAC-CE message or a single DCI message.

Aspect 10 is the method of aspect 6, where the activation of the at least one cell group is included in a message that includes a plurality of fields each corresponding to a different cell group within the set of multiple cell groups, where at least one bit in the plurality of fields indicates that the at least one cell group is being activated.

Aspect 11 is the method of aspect 10, where the message further indicates an L1 measurement reporting configuration for at least one deactivated cell group.

Aspect 12 is the method of aspect 6, where the activation of the at least one cell group is included in a message that includes a number of octets corresponding to a first maximum number of cell groups configured for the L1 or L2 mobility, an overall number of cell groups configured for the L1 or L2 mobility, or a second maximum number of cell groups that can be configured for the L1 or L2 mobility for the UE.

Aspect 13 is the method of aspect 6, where the activation of the at least one cell group is included in a message that further includes at least one of a channel state information reference signal (CSI-RS) for tracking or a CSI-RS configuration for each deactivated cell group.

Aspect 14 is the method of any of aspects 1-13, where the L1 or L2 signaling includes: a first identifier for the PCG, a second identifier for the SpCell, and a third identifier for an SpCell configuration.

Aspect 15 is the method of any of aspects 1-14, where the PCG is indicated in a message that includes one or more of: a first identifier for a cell group to serve as the PCG, a second identifier for the cell to serve as the SpCell, and a third identifier for SpCell configuration.

Aspect 16 is the method of any of aspects 1-15, further including: receiving additional L1 or L2 signaling indicating a different cell group within the set of multiple cell groups to serve as the PCG, where the different cell group to serve as the PCG includes a second cell to serve as the SpCell.

Aspect 17 is the method of any of aspects 1-16, further including: receiving, via the L1 or L2 signaling, an activation or a deactivation of a one or more cell groups within the set of multiple cell groups.

Aspect 18 is an apparatus for wireless communication at a user equipment (UE) comprising a memory and at least one processor coupled to the memory and based at least in part on information stored in the memory, the at least one processor is configured to perform a method in accordance with any of aspects 1-17.

Aspect 19 is an apparatus for wireless communications, including means for performing a method in accordance with any of aspects 1-17.

Aspect 20 is the apparatus of aspect 18 or 19 further including at least one transceiver configured to receive the L1 or L2 mobility cell configuration and receive the L1 or L2 signaling indicating the PCG.

Aspect 21 is a non-transitory computer-readable medium including instructions that, when executed by an apparatus, cause the apparatus to perform a method in accordance with any of aspects 1-17.

Aspect 22 is a method of wireless communication at a network node, including transmitting a layer 1 (L1) or layer 2 (L2) mobility cell configuration for a set of multiple cell groups for L1 or L2 inter-cell mobility, each cell group including multiple cells, where cell groups within the set of multiple cell groups are able to be activated or deactivated for L1 or L2 mobility; and transmitting L1 or L2 signaling indicating a primary cell group (PCG) from one or more activated cell groups, the PCG including a cell that serves as a special cell (SpCell).

Aspect 23 is the method of aspect 22, further including: transmitting, via the L1 or L2 signaling, an indication of the SpCell for the PCG.

Aspect 24 is the method of any of aspects 21-23, where the L1 or L2 signaling further indicates at least one of: a cell group ID for an activation of a cell group, a bitmap indicating the activation or a deactivation of one or more cell groups, a cell ID for the SpCell, an SpCell configuration, a transmission configuration indicator (TCI) state for the SpCell, a reference signal for beam refinement, an L1 measurement configuration for one or more deactivated cells, or an L1 report configuration for the one or more deactivated cells.

Aspect 25 is the method of any of aspects 21-24, further including: transmitting additional L1 or L2 signaling indicating a different cell within the PCG to serve as the SpCell.

Aspect 26 is the method of any of aspects 21-25, where the SpCell includes: a primary cell (PCell), or a primary secondary cell (PSCell).

Aspect 27 is the method of any of aspects 21-26, further including: transmitting, prior to or concurrently with an indication of the PCG, an activation of at least one cell group via the L1 or L2 signaling.

Aspect 28 is the method of aspect 27, where the activation of the at least one cell group and the indication of the PCG are transmitted in one or more of a medium access control-control element (MAC-CE) or downlink control information (DCI).

Aspect 29 is the method of aspect 28, where the activation of the at least one cell group is transmitted in a first MAC-CE or a first DCI message and the PCG is indicated in a second MAC-CE message or a second DCI message.

Aspect 30 is the method of aspect 28, where the activation of the at least one cell group and the indication of the PCG are transmitted in a single MAC-CE message or a single DCI message.

Aspect 31 is the method of aspect 27, where the activation of the at least one cell group is included in a message that includes a plurality of fields each corresponding to a different cell group within the set of multiple cell groups, where at least one bit in the plurality of fields indicates that the at least one cell group is being activated.

Aspect 32 is the method of aspect 31, where the message further indicates an L1 measurement reporting configuration for at least one deactivated cell group.

Aspect 33 is the method of aspect 27, where the activation of the at least one cell group is included in a message that includes a number of octets corresponding to a first maximum number of cell groups configured for the L1 or L2 mobility, an overall number of cell groups configured for the L1 or L2 mobility, or a second maximum number of cell groups that can be configured for the L1 or L2 mobility for a user equipment (UE).

Aspect 34 is the method of aspect 27, where the activation of the at least one cell group is included in a message that further includes at least one of a channel state information reference signal (CSI-RS) for tracking or a CSI-RS configuration for each deactivated cell group.

Aspect 35 is the method of any of aspects 22-34, where the L1 or L2 signaling includes: a first identifier for the PCG, a second identifier for the SpCell, and a third identifier for an SpCell configuration.

Aspect 36 is the method of any of aspects 22-35, where the PCG is indicated in a message that includes one or more of: a first identifier for a cell group to serve as the PCG, a second identifier for the cell to serve as the SpCell, and a third identifier for SpCell configuration.

Aspect 37 is the method of any of aspects 22-36, further including: transmitting additional L1 or L2 signaling indicating a different cell group within the set of multiple cell groups to serve as the PCG, where the different cell group to serve as the PCG includes a second cell to serve as the SpCell.

Aspect 38 is the method of any of aspects 22-37, further including: transmitting, via the L1 or L2 signaling, an activation or a deactivation of a one or more cell groups within the set of multiple cell groups.

Aspect 39 is an apparatus for wireless communication at a network node including a memory and at least one processor coupled to the memory and based at least in part on information stored in the memory, the at least one processor is configured to perform a method in accordance with any of aspects 22-38.

Aspect 40 is an apparatus for wireless communications, including means for performing a method in accordance with any of aspects 22-38.

Aspect 41 is the apparatus of aspects 39 or 40, further including at least one transceiver configured to transmit the L1 or L2 mobility cell configuration and transmit the L1 or L2 signaling indicating the PCG.

Aspect 42 is a non-transitory computer-readable medium including instructions that, when executed by an apparatus, cause the apparatus to perform a method in accordance with any of aspects 22-38.

What is claimed is:

1. An apparatus for wireless communication at a user equipment (UE), comprising:
   memory; and
   at least one processor coupled to the memory and, based at least in part on information stored in the memory, the at least one processor is configured to:
      receive a layer 1 (L1) or layer 2 (L2) mobility cell configuration for a set of multiple cell groups for L1 or L2 inter-cell mobility, each cell group comprising multiple cells, wherein cell groups within the set of multiple cell groups are able to be activated or deactivated for L1 or L2 mobility; and
      receive L1 or L2 signaling indicating a primary cell group (PCG) from one or more activated cell groups, the PCG including a cell that serves as a special cell (SpCell), wherein the L1 or L2 signaling includes a cell group activation or deactivation message that includes a plurality of fields in which each field corresponds to an activation or a deactivation of one cell group within the set of multiple cell groups.

2. The apparatus of claim 1, wherein the at least one processor is further configured to:
   receive, via the L1 or L2 signaling, an indication of the SpCell for the PCG.

3. The apparatus of claim 2, wherein the L1 or L2 signaling further indicates at least one of:
   a cell group ID for the activation of a cell group,
   a bitmap indicating the activation or the deactivation of one or more cell groups,
   a cell ID for the SpCell,
   an SpCell configuration,
   a transmission configuration indicator (TCI) state for the SpCell,
   a reference signal for beam refinement,
   an L1 measurement configuration for one or more deactivated cells, or
   an L1 report configuration for the one or more deactivated cells.

4. The apparatus of claim 2, wherein the at least one processor is further configured to:
   receive additional L1 or L2 signaling indicating a different cell within the PCG to serve as the SpCell.

5. The apparatus of claim 2, wherein the SpCell comprises:
   a primary cell (PCell), or
   a primary secondary cell (PSCell).

6. The apparatus of claim 1, wherein the at least one processor is further configured to:
   receive, prior to or concurrently with an indication of the PCG, the activation of at least one cell group via the L1 or L2 signaling.

7. The apparatus of claim 6, wherein the activation of the at least one cell group and the indication of the PCG are received in one or more of a medium access control-control element (MAC-CE) or downlink control information (DCI).

8. The apparatus of claim 7, wherein the activation of the at least one cell group is received in a first MAC-CE or a first DCI message and the PCG is indicated in a second MAC-CE message or a second DCI message.

9. The apparatus of claim 7, wherein the activation of the at least one cell group and the indication of the PCG are received in a single MAC-CE message or a single DCI message.

10. The apparatus of claim 6, wherein at least one bit in the plurality of fields indicates that the at least one cell group is being activated.

11. The apparatus of claim 10, wherein the cell group activation or deactivation message further indicates an L1 measurement reporting configuration for at least one deactivated cell group.

12. The apparatus of claim 6, wherein the activation of the at least one cell group is comprised in a message that includes a number of octets corresponding to a first maximum number of cell groups configured for the L1 or L2 mobility, an overall number of cell groups configured for the L1 or L2 mobility, or a second maximum number of cell groups that can be configured for the L1 or L2 mobility for the UE.

13. The apparatus of claim 6, wherein the activation of the at least one cell group is comprised in a message that further includes at least one of a channel state information reference signal (CSI-RS) for tracking or a CSI-RS configuration for each deactivated cell group.

14. The apparatus of claim 1, wherein the L1 or L2 signaling includes:
a first identifier for the PCG,
a second identifier for the SpCell, and
a third identifier for an SpCell configuration.

15. The apparatus of claim 1, wherein the PCG is indicated in a message that includes one or more of:
a first identifier for a cell group to serve as the PCG,
a second identifier for the cell to serve as the SpCell, and
a third identifier for SpCell configuration.

16. The apparatus of claim 1, wherein the at least one processor is further configured to:
receive additional L1 or L2 signaling indicating a different cell group within the set of multiple cell groups to serve as the PCG, wherein the different cell group to serve as the PCG includes a second cell to serve as the SpCell.

17. The apparatus of claim 1, further comprising a transceiver coupled to the at least one processor.

18. A method of wireless communication at a user equipment (UE), comprising:
receiving a layer 1 (L1) or layer 2 (L2) mobility cell configuration for a set of multiple cell groups for L1 or L2 inter-cell mobility, each cell group comprising multiple cells, wherein cell groups within the set of multiple cell groups are able to be activated or deactivated for L1 or L2 mobility; and
receiving L1 or L2 signaling indicating a primary cell group (PCG) from one or more activated cell groups, the PCG including a cell that serves as a special cell (SpCell), wherein the L1 or L2 signaling includes a cell group activation or deactivation message that includes a plurality of fields in which each field corresponds to an activation or a deactivation of one cell group within the set of multiple cell groups.

19. An apparatus for wireless communication at a network node, comprising:
memory; and
at least one processor coupled to the memory and, based at least in part on information stored in the memory, the at least one processor is configured to:
transmit a layer 1 (L1) or layer 2 (L2) mobility cell configuration for a set of multiple cell groups for L1 or L2 inter-cell mobility, each cell group comprising multiple cells, wherein cell groups within the set of multiple cell groups are able to be activated or deactivated for L1 or L2 mobility; and
transmit L1 or L2 signaling indicating a primary cell group (PCG) from one or more activated cell groups, the PCG including a cell that serves as a special cell (SpCell), wherein the L1 or L2 signaling includes a cell group activation or deactivation message that includes a plurality of fields in which each field corresponds to an activation or a deactivation of one cell group within the set of multiple cell groups.

20. The apparatus of claim 19, wherein the at least one processor is further configured to:
transmit, via the L1 or L2 signaling, an indication of the SpCell for the PCG.

21. The apparatus of claim 20, wherein the L1 or L2 signaling further indicates at least one of:
a cell group ID for the activation of a cell group,
a bitmap indicating the activation or the deactivation of one or more cell groups,
a cell ID for the SpCell,
an SpCell configuration,
a transmission configuration indicator (TCI) state for the SpCell,
a reference signal for beam refinement,
an L1 measurement configuration for one or more deactivated cells, or
an L1 report configuration for the one or more deactivated cells.

22. The apparatus of claim 20, wherein the at least one processor is further configured to:
transmit additional L1 or L2 signaling indicating a different cell within the PCG to serve as the SpCell.

23. The apparatus of claim 19, wherein the at least one processor is further configured to:
transmit, prior to or concurrently with an indication of the PCG, the activation of at least one cell group via the L1 or L2 signaling.

24. The apparatus of claim 23, wherein the activation of the at least one cell group and the indication of the PCG are transmitted in one or more of a medium access control-control element (MAC-CE) or downlink control information (DCI).

25. The apparatus of claim 24, wherein the activation of the at least one cell group is transmitted in a first MAC-CE or a first DCI message and the PCG is indicated in a second MAC-CE message or a second DCI message.

26. The apparatus of claim 24, wherein the activation of the at least one cell group and the indication of the PCG are transmitted in a single MAC-CE message or a single DCI message.

27. The apparatus of claim 23, wherein at least one bit in the plurality of fields indicates that the at least one cell group is being activated.

28. The apparatus of claim 19, further comprising a transceiver coupled to the at least one processor.

29. A method of wireless communication at a network node, comprising:
transmitting a layer 1 (L1) or layer 2 (L2) mobility cell configuration for a set of multiple cell groups for L1 or L2 inter-cell mobility, each cell group comprising multiple cells, wherein cell groups within the set of multiple cell groups are able to be activated or deactivated for L1 or L2 mobility; and
transmitting L1 or L2 signaling indicating a primary cell group (PCG) from one or more activated cell groups, the PCG including a cell that serves as a special cell (SpCell), wherein the L1 or L2 signaling includes a cell group activation or deactivation message that includes a plurality of fields in which each field corresponds to an activation or a deactivation of one cell group within the set of multiple cell groups.

* * * * *